(12) United States Patent
Kurioka et al.

(10) Patent No.: US 9,274,324 B2
(45) Date of Patent: *Mar. 1, 2016

(54) ZOOM LENS SYSTEM, IMAGING DEVICE AND CAMERA

(71) Applicant: Panasonic Corporation, Kadoma-shi, Osaka (JP)

(72) Inventors: Yoshiaki Kurioka, Osaka (JP); Takehiro Nishioka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 25 days.

This patent is subject to a terminal disclaimer.

(21) Appl. No.: 13/798,115

(22) Filed: Mar. 13, 2013

(65) Prior Publication Data
US 2013/0242170 A1 Sep. 19, 2013

(30) Foreign Application Priority Data

Mar. 14, 2012 (JP) .................................. 2012-057037
Feb. 7, 2013 (JP) .................................. 2013-022128

(51) Int. Cl.
G02B 15/14 (2006.01)
G02B 13/00 (2006.01)
G02B 15/173 (2006.01)

(52) U.S. Cl.
CPC .............. *G02B 15/14* (2013.01); *G02B 13/009* (2013.01); *G02B 15/173* (2013.01)

(58) Field of Classification Search
CPC ........ G02B 15/00; G02B 15/14; G02B 15/16; G02B 15/163; G02B 15/20; G02B 15/22; G02B 15/28; G02B 26/64; G02B 26/646; G02B 13/009
USPC .................................................. 359/676–688
See application file for complete search history.

(56) References Cited

U.S. PATENT DOCUMENTS 5,042,927 A * 8/1991 Ogawa et al. ................. 359/683
5,751,496 A * 5/1998 Hamano ....................... 359/677

(Continued)

FOREIGN PATENT DOCUMENTS

JP H07-151975 A 6/1995
JP H08-043734 A 2/1996

(Continued)

*Primary Examiner* — Thong Nguyen
(74) *Attorney, Agent, or Firm* — James W. Judge

(57) ABSTRACT

A zoom lens system, in order from an object side to an image side, comprising: a first lens unit having positive optical power; a second lens unit having negative optical power; a third lens unit having positive optical power; a fourth lens unit; and at least one subsequent lens unit, wherein the subsequent lens unit(s) includes a lens unit having negative optical power, the first lens unit is composed of two or less lens elements, the third lens unit is composed of four or more lens elements, the first lens unit and the second lens unit move along an optical axis in zooming, and the condition: $0 < |f_W/f_e| < 2$ ($f_e$: a focal length of a lens unit having negative optical power and located closest to the image side in the entire system, $f_W$: a focal length of the entire system at a wide-angle limit) is satisfied.

12 Claims, 19 Drawing Sheets

(56) References Cited

U.S. PATENT DOCUMENTS

| | | | |
|---|---|---|---|
| 7,417,801 B2 * | 8/2008 | Nakatani et al. | 359/687 |
| 7,649,693 B2 * | 1/2010 | Kuroda et al. | 359/676 |
| 7,813,051 B2 * | 10/2010 | Saori | 359/683 |
| 2011/0273780 A1 * | 11/2011 | Hosoi et al. | 359/690 |
| 2012/0050603 A1 * | 3/2012 | Imaoka et al. | 348/347 |
| 2013/0093940 A1 * | 4/2013 | Matsumura | 348/345 |

FOREIGN PATENT DOCUMENTS

| | | |
|---|---|---|
| JP | H08-220439 A | 8/1996 |
| JP | 2006-251462 A | 9/2006 |
| JP | 2007-264173 A | 10/2007 |
| JP | 2007-264390 A | 10/2007 |
| JP | 2009-075581 A | 4/2009 |
| JP | 2009-150970 A | 7/2009 |
| JP | 4840354 B2 | 10/2011 |

* cited by examiner

ZOOM LENS SYSTEM, IMAGING DEVICE AND CAMERA

CROSS-REFERENCE TO RELATED APPLICATION

This application is based on application No. 2012-057037 filed in Japan on Mar. 14, 2012 and application No. 2013-022128 filed in Japan on Feb. 7, 2013, the contents of which are hereby incorporated by reference.

BACKGROUND

1. Field

The present disclosure relates to zoom lens systems, imaging devices, and cameras.

2. Description of the Related Art

With recent progress in the development of solid-state image sensors such as high-definition CCD (Charge Coupled Device) and CMOS (Complementary Metal-Oxide Semiconductor), digital still cameras and digital video cameras (simply referred to as "digital cameras", hereinafter) are rapidly spreading which employ an imaging device including an imaging optical system of high optical performance corresponding to the above-mentioned high-definition solid-state image sensors. Among the digital cameras of high optical performance, in particular, from a convenience point of view, compact digital cameras are strongly desired which employ a zoom lens system having a high zooming ratio and covering, by itself, a wide focal-length range from a wide angle condition to a highly telephoto condition. Furthermore, compact digital cameras are desired which employ a zoom lens system having a wide angle range where a photographing field is large.

Various kinds of zoom lens systems as follows have been proposed for use in the compact digital cameras.

Japanese Laid-Open Patent Publications Nos. 2009-075581, 2009-150970, 2007-264390, 2007-264173, 08-220439, 08-043734, and 07-151975, and Japanese Patent No. 4840354 each disclose a zoom lens having five lens units of positive, negative, positive, positive, and negative in order from an object side to an image side.

SUMMARY

The present disclosure provides a zoom lens system which is excellent in optical performance, compact, and bright because having a small F-number from a wide-angle limit to a telephoto limit, and which is sufficiently adaptable to wide-angle shooting. Further, the present disclosure provides an imaging device including the zoom lens system, and a camera employing the imaging device.

The novel concepts disclosed herein were achieved in order to solve the foregoing problems in the related art, and herein is disclosed:

a zoom lens system having a plurality of lens units, each lens unit being composed of at least one lens element, the zoom lens system, in order from an object side to an image side, comprising:

a first lens unit having positive optical power;
a second lens unit having negative optical power;
a third lens unit having positive optical power;
a fourth lens unit; and
at least one subsequent lens unit, wherein
the subsequent lens unit(s) includes a lens unit having negative optical power,
the first lens unit is composed of two or less lens elements,
the third lens unit is composed of four or more lens elements,
in zooming from a wide-angle limit to a telephoto limit at the time of image taking, the first lens unit and the second lens unit move along an optical axis, and
the following condition (1) is satisfied:

$$0 < |f_W/f_e| < 2 \qquad (1)$$

where,
$f_e$ is a focal length of a lens unit having negative optical power and located closest to the image side in the entire system, and
$f_W$ is a focal length of the entire system at a wide-angle limit.

The novel concepts disclosed herein were achieved in order to solve the foregoing problems in the related art, and herein is disclosed:

an imaging device capable of outputting an optical image of an object as an electric image signal, comprising:

a zoom lens system that forms the optical image of the object; and
an image sensor that converts the optical image formed by the zoom lens system into the electric image signal, wherein
the zoom lens system is a zoom lens system having a plurality of lens units, each lens unit being composed of at least one lens element,
the zoom lens system, in order from an object side to an image side, comprising:

a first lens unit having positive optical power;
a second lens unit having negative optical power;
a third lens unit having positive optical power;
a fourth lens unit; and
at least one subsequent lens unit, wherein
the subsequent lens unit(s) includes a lens unit having negative optical power,
the first lens unit is composed of two or less lens elements,
the third lens unit is composed of four or more lens elements,
in zooming from a wide-angle limit to a telephoto limit at the time of image taking, the first lens unit and the second lens unit move along an optical axis, and
the following condition (1) is satisfied:

$$0 < |f_W/f_e| < 2 \qquad (1)$$

where,
$f_e$ is a focal length of a lens unit having negative optical power and located closest to the image side in the entire system, and
$f_W$ is a focal length of the entire system at a wide-angle limit.

The novel concepts disclosed herein were achieved in order to solve the foregoing problems in the related art, and herein is disclosed:

a camera for converting an optical image of an object into an electric image signal, and then performing at least one of displaying and storing of the converted image signal, comprising:

an imaging device including a zoom lens system that forms the optical image of the object, and an image sensor that converts the optical image formed by the zoom lens system into the electric image signal, wherein
the zoom lens system is a zoom lens system having a plurality of lens units, each lens unit being composed of at least one lens element,
the zoom lens system, in order from an object side to an image side, comprising:

a first lens unit having positive optical power;
a second lens unit having negative optical power;
a third lens unit having positive optical power;
a fourth lens unit; and at least one subsequent lens unit, wherein the subsequent lens unit(s) includes a lens unit having negative optical power, the first lens unit is composed of two or less lens elements, the third lens unit is composed of four or more lens elements, in zooming from a wide-angle limit to a telephoto limit at the time of image taking, the first lens unit and the second lens unit move along an optical axis, and the following condition (1) is satisfied:

$$0 < |f_W/f_e| < 2 \tag{1}$$

where, $f_e$ is a focal length of a lens unit having negative optical power and located closest to the image side in the entire system, and $f_W$ is a focal length of the entire system at a wide-angle limit.

The zoom lens system according to the present disclosure is excellent in optical performance, compact, and bright because having a small F-number from a wide-angle limit to a telephoto limit, and is sufficiently adaptable to wide-angle shooting.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
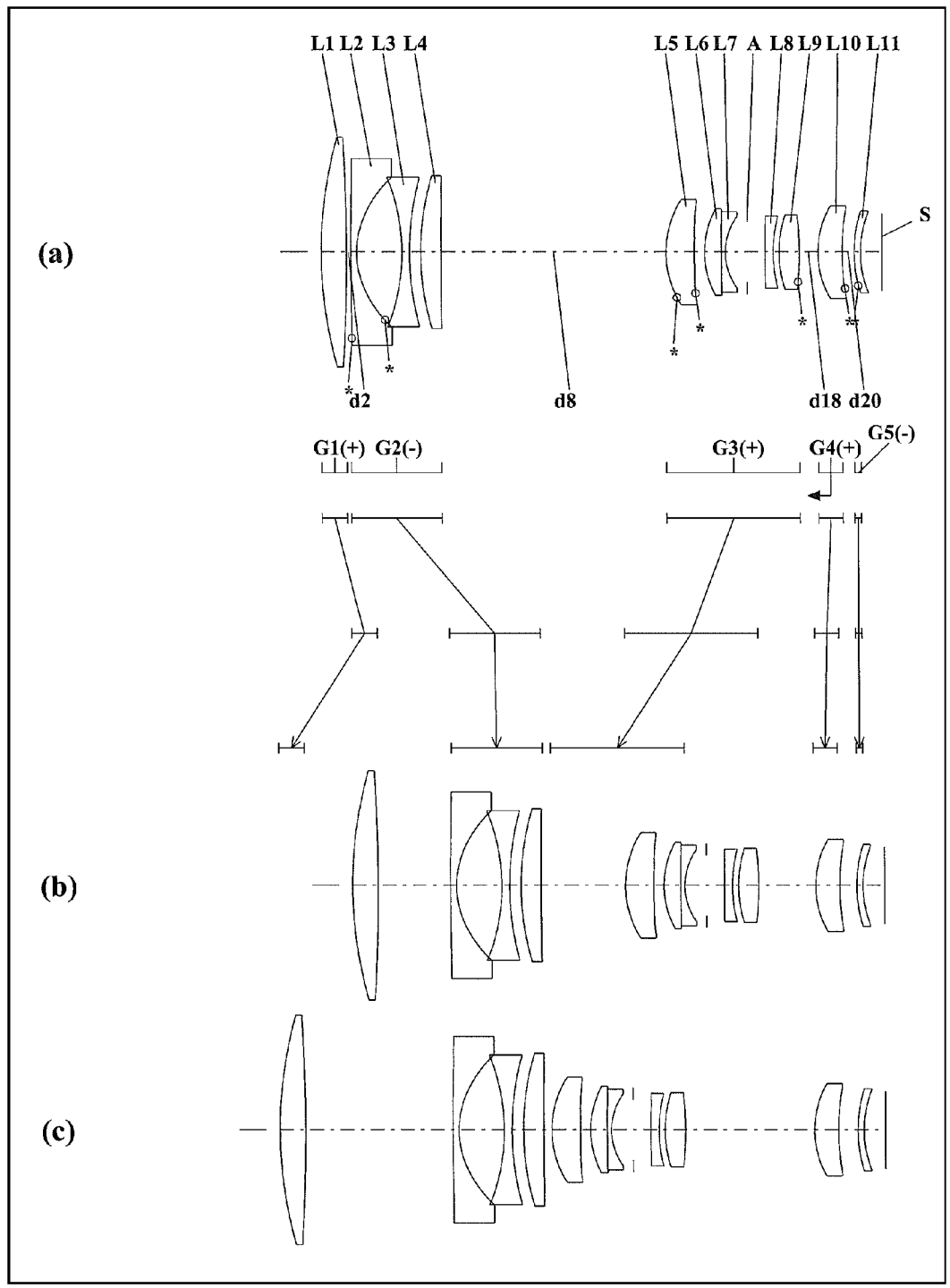
FIG. 1 is a lens arrangement diagram showing an infinity in-focus condition of a zoom lens system according to Embodiment 1 (Numerical Example 1)
Figure 2:
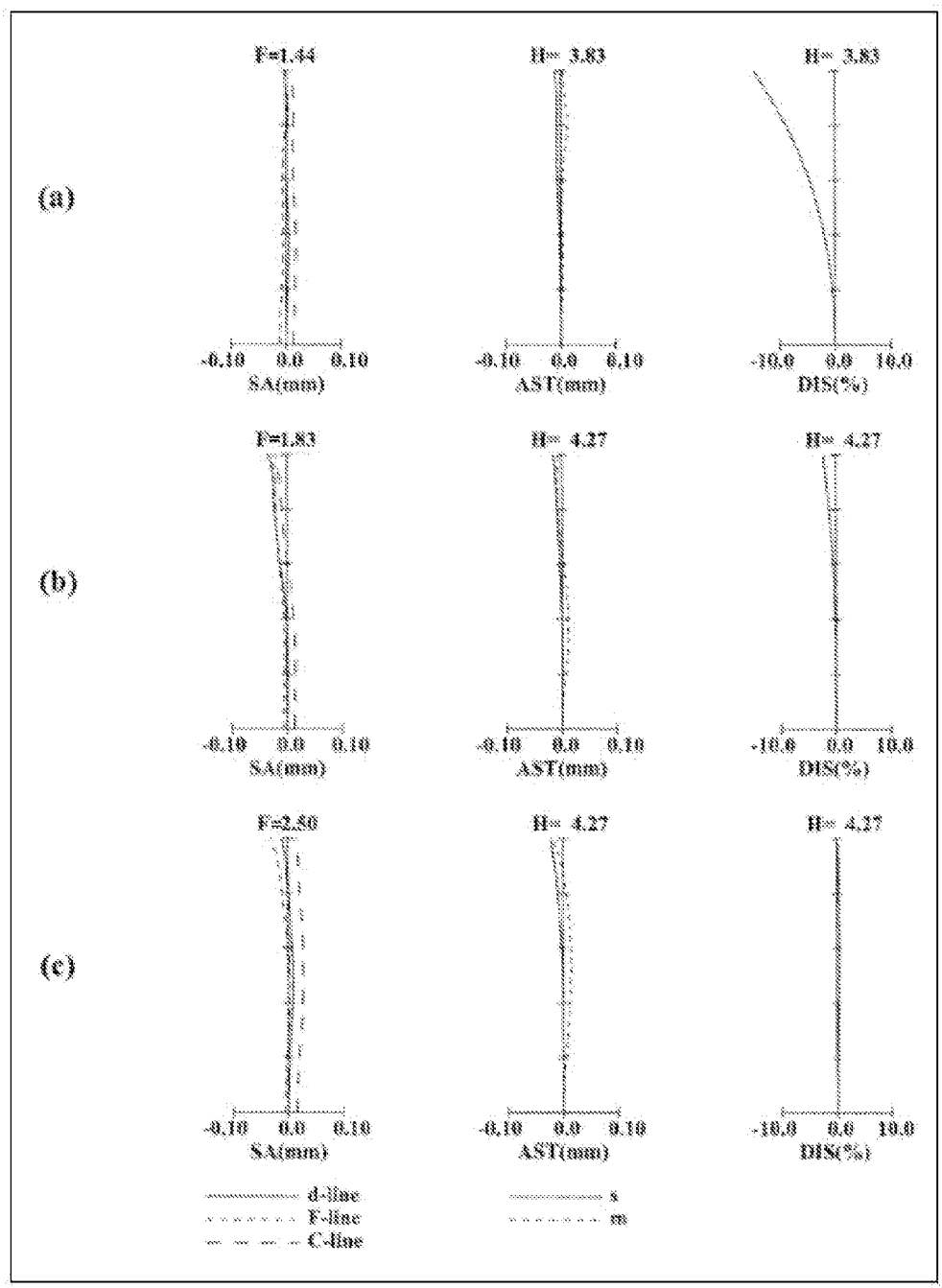
FIG. 2 is a longitudinal aberration diagram of an infinity in-focus condition of a zoom lens system according to Numerical Example 1.
Figure 3:
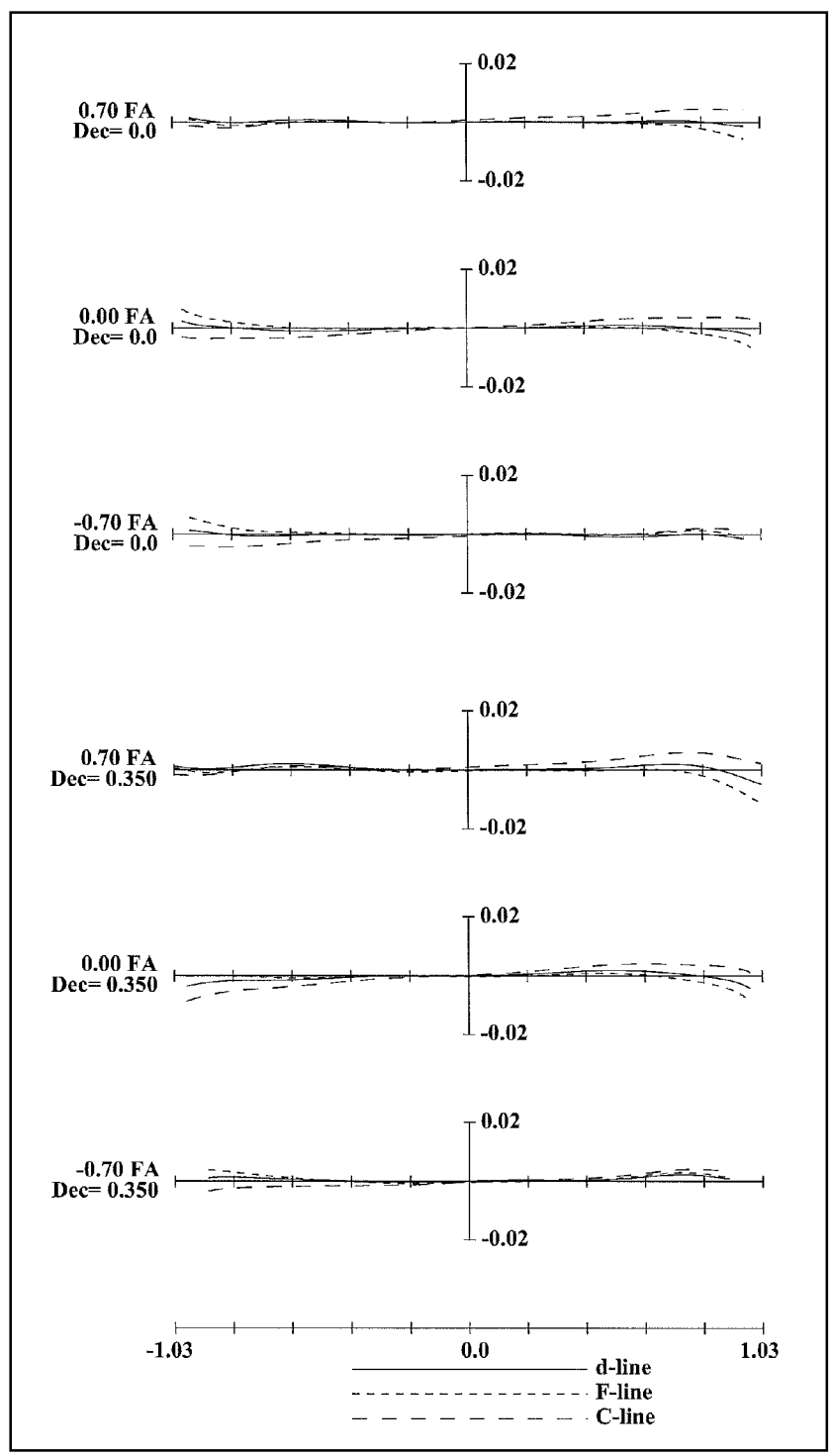
FIG. 3 is a lateral aberration diagram of a zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 6

FIGS. 1, 4, 7, 10, 13, and 16 are lens arrangement diagrams of zoom lens systems according to Embodiments 1 to 6, respectively.

Each of FIGS. 1, 4, 7, 10, 13, and 16 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit. Further, in each Fig., an arrow imparted to a lens unit indicates focusing from an infinity in-focus condition to a close-object in-focus condition. That is, the arrow indicates a moving direction of a fourth lens unit G4 described later, in focusing from an infinity in-focus condition to a close-object in-focus condition.

Each of the zoom lens systems according to Embodiments 1 to 5, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having negative optical power. The zoom lens system according to Embodiment 6, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having positive optical power, and a sixth lens unit G6 having negative optical power.

In FIGS. 1, 4, 7, 10, 13, and 16, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

As shown in FIGS. 1, 4, 7, 10, 13, and 16, in the zoom lens systems according to Embodiments 1 to 6, an aperture diaphragm A is provided between a lens element and a lens element in the third lens unit G3.

Figure 10:
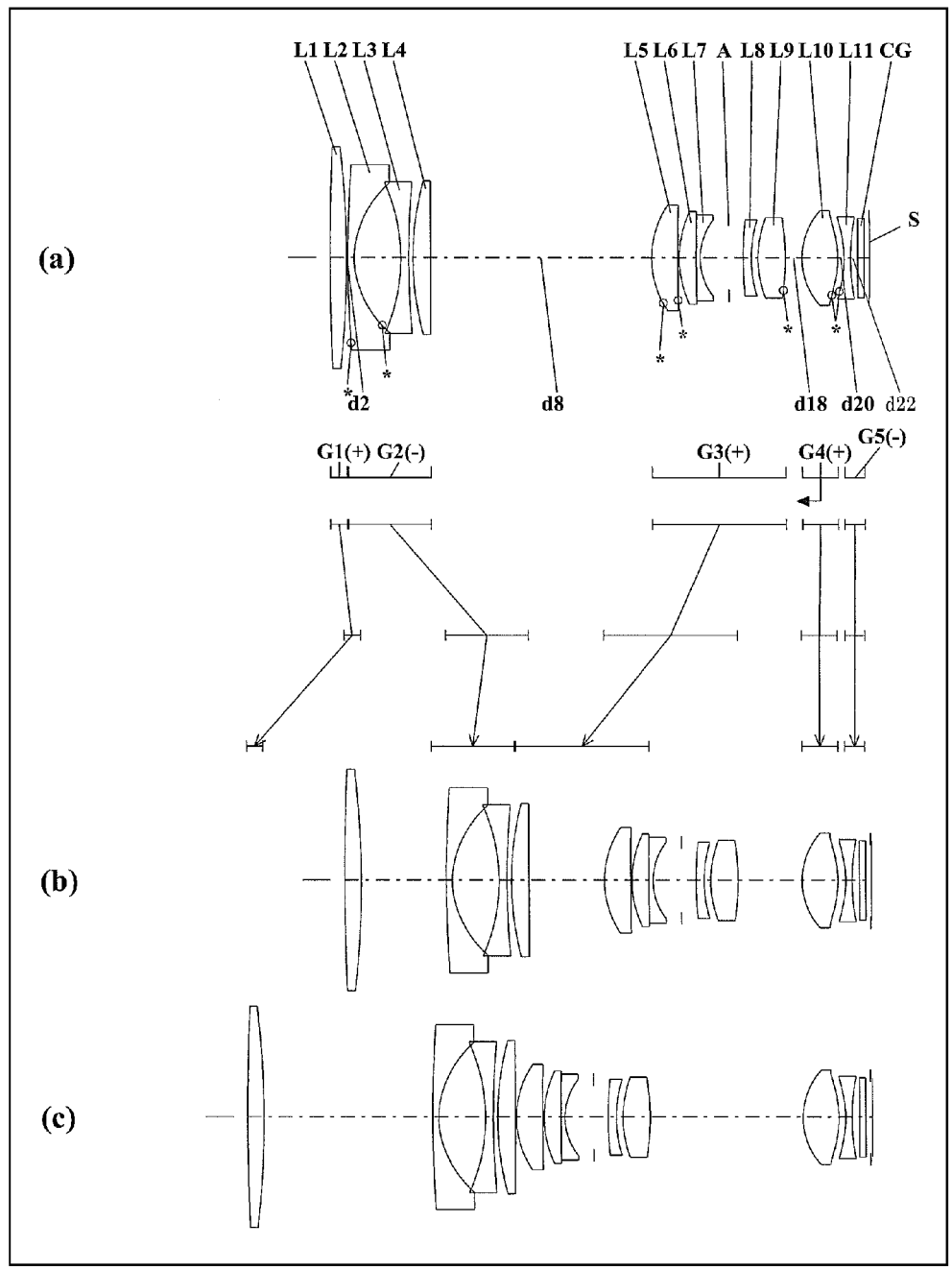
FIG. 10 is a lens arrangement diagram showing an infinity in-focus condition of a zoom lens system according to Embodiment 4 (Numerical Example 4)
Figure 11:
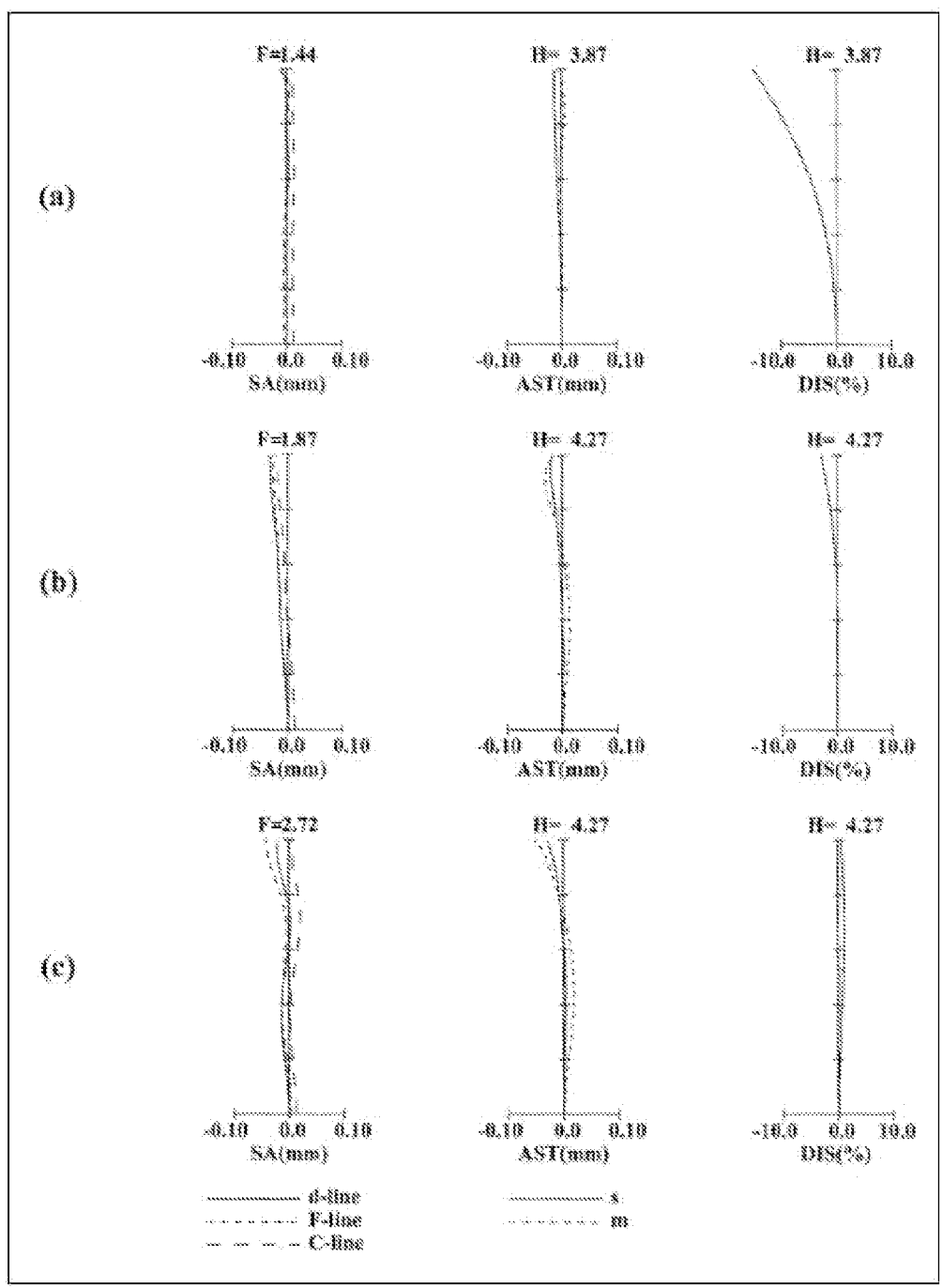
FIG. 11 is a longitudinal aberration diagram of an infinity in-focus condition of a zoom lens system according to Numerical Example 4.
Figure 12:
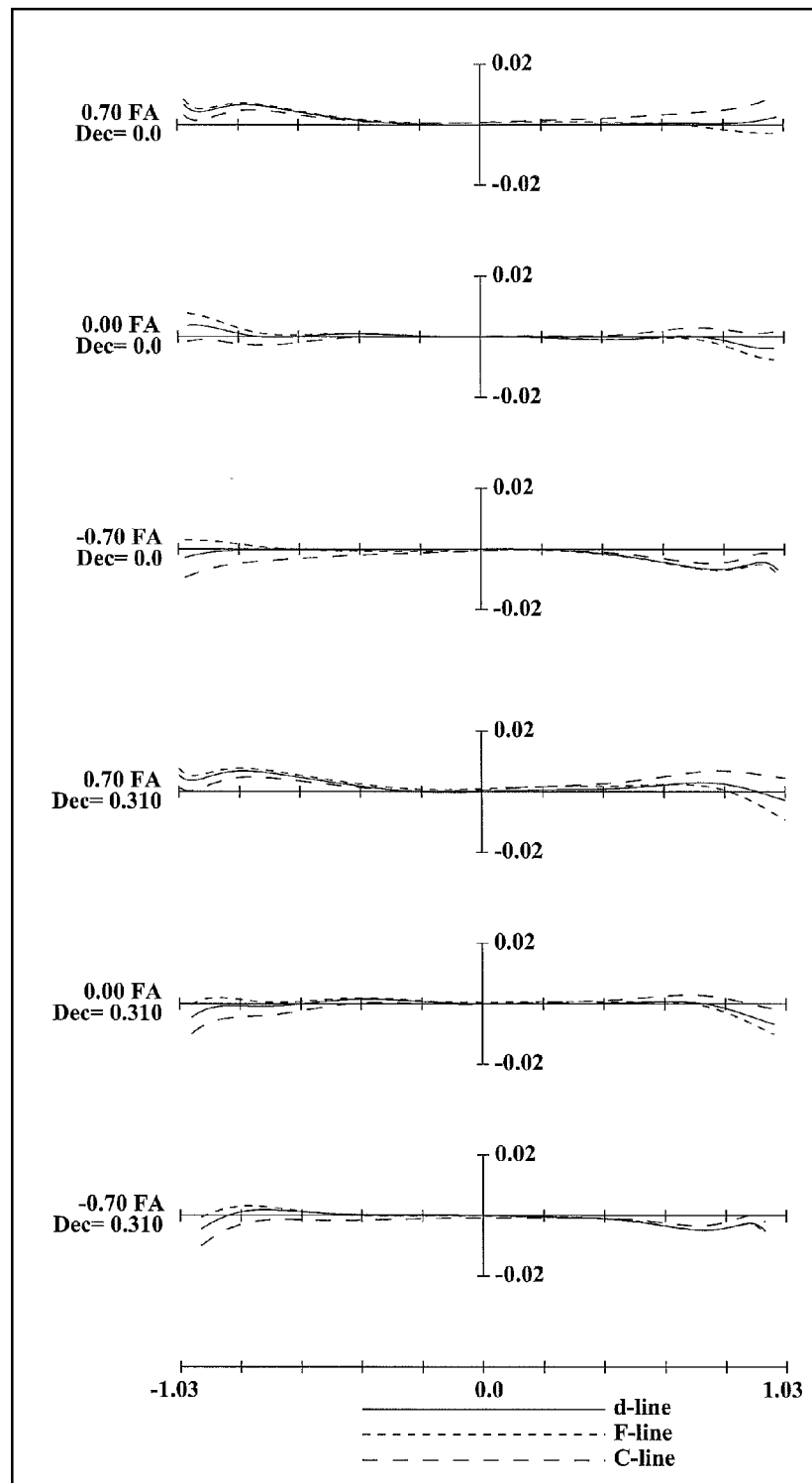
FIG. 12 is a lateral aberration diagram of a zoom lens system according to Numerical Example 4 at a telephoto limit in a basic state where image blur compensation is not performed and in an image blur compensation state.
Figure 13:
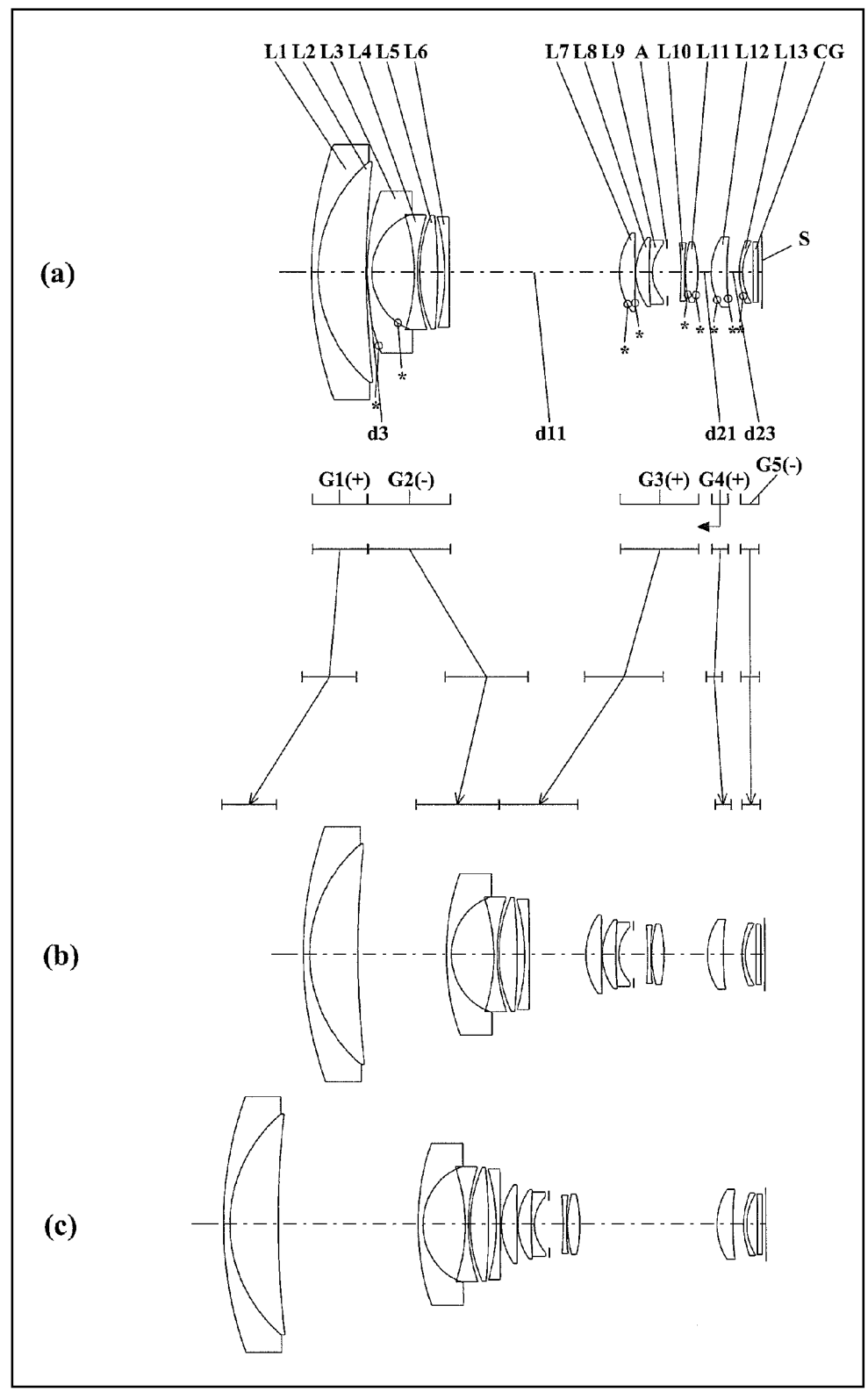
FIG. 13 is a lens arrangement diagram showing an infinity in-focus condition of a zoom lens system according to Embodiment 5 (Numerical Example 5)
Figure 14:
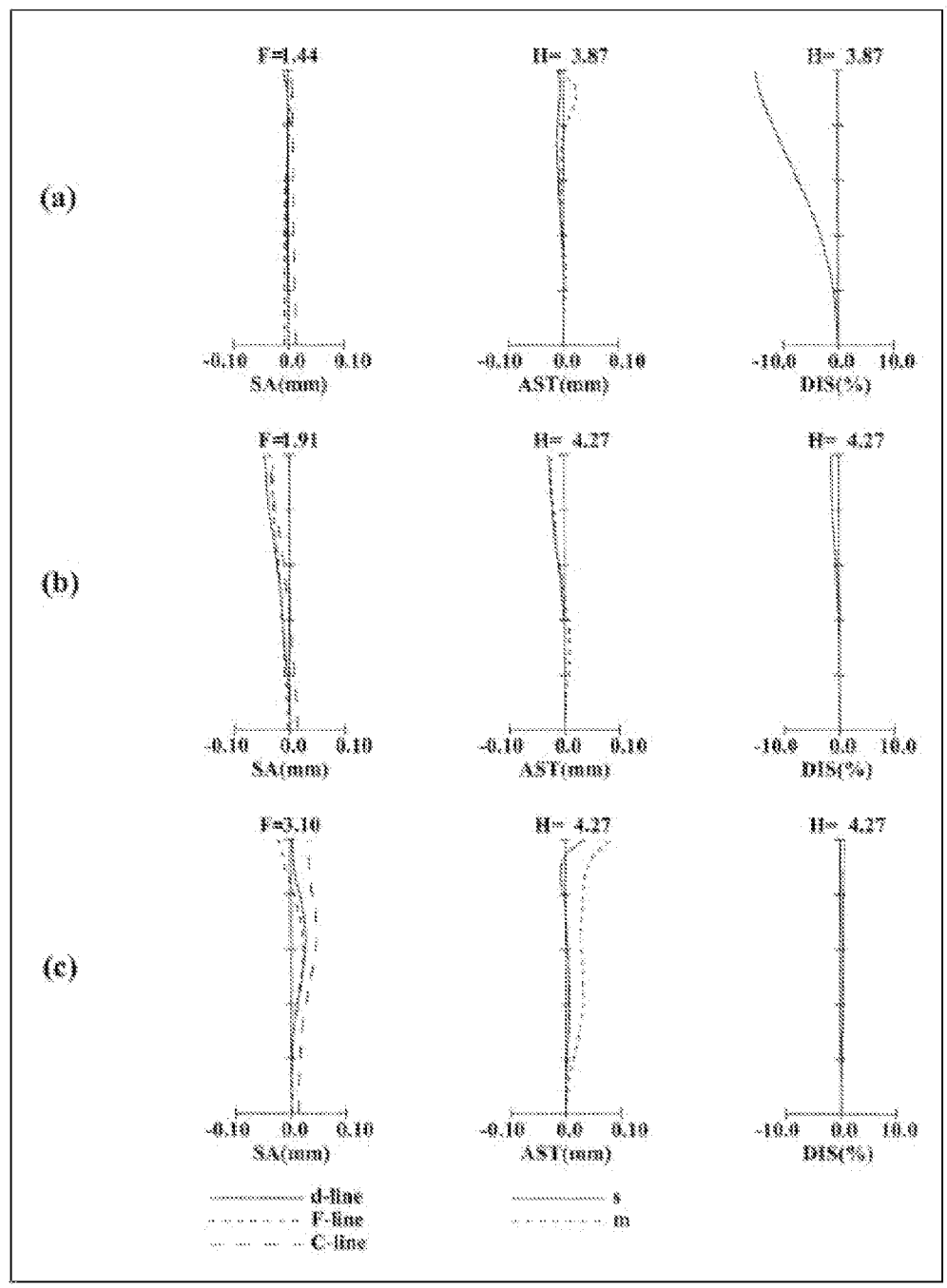
FIG. 14 is a longitudinal aberration diagram of an infinity in-focus condition of a zoom lens system according to Numerical Example 5.
Figure 15:
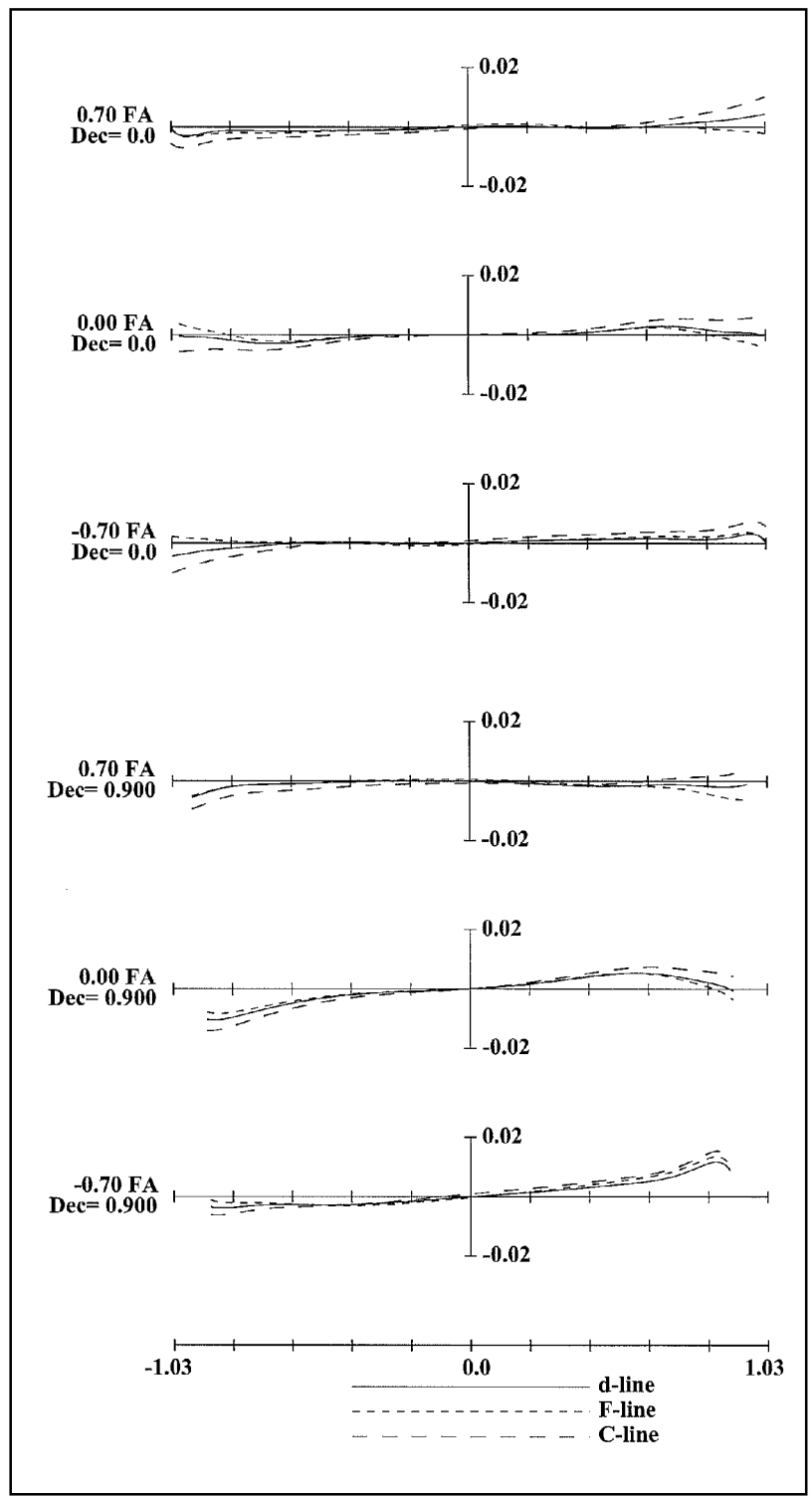
FIG. 15 is a lateral aberration diagram of a zoom lens system according to Numerical Example 5 at a telephoto limit in a basic state where image blur compensation is not performed and in an image blur compensation state.

Further, as shown in FIGS. 10 and 13, in the zoom lens systems according to Embodiments 4 and 5, a plane parallel plate CG is provided between the fifth lens unit G5 and the image surface S.

Embodiment 1

As shown in FIG. 1, the first lens unit G1 comprises solely a bi-convex first lens element L1.

The second lens unit G2, in order from the object side to the image side, comprises: a negative meniscus second lens element L2 with the convex surface facing the object side; a bi-concave third lens element L3; and a positive meniscus fourth lens element L4 with the convex surface facing the object side. The second lens element L2 has two aspheric surfaces.

The third lens unit G3, in order from the object side to the image side, comprises: a positive meniscus fifth lens element L5 with the convex surface facing the object side; a positive meniscus sixth lens element L6 with the convex surface facing the object side; a negative meniscus seventh lens element L7 with the convex surface facing the object side; an aperture diaphragm A, a negative meniscus eighth lens element L8 with the convex surface facing the object side; and a bi-convex ninth lens element L9. Among these, the sixth lens element L6 and the seventh lens element L7 are cemented with each other. The fifth lens element L5 has two aspheric surfaces. The ninth lens element L9 has an aspheric image side surface.

The fourth lens unit G4 comprises solely a positive meniscus tenth lens element L10 with the convex surface facing the object side. The tenth lens element L10 has an aspheric image side surface.

The fifth lens unit G5 comprises solely a negative meniscus eleventh lens element L11 with the convex surface facing the object side. The eleventh lens element L11 has an aspheric object side surface.

In zooming from a wide-angle limit to a telephoto limit at the time of image taking, the first lens unit G1 moves to the object side with locus of a convex to the image side, the second lens unit G2 moves to the image side, the third lens unit G3 moves to the object side, the fourth lens unit G4 moves to the object side, and the fifth lens unit G5 does not move. That is, in zooming, the first lens unit G1, the second lens unit G2, the third lens unit G3, and the fourth lens unit G4 individually move along the optical axis, and the fifth lens unit G5 is fixed with respect to the image surface S, so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 increases.

In focusing from an infinity in-focus condition to a close-object in-focus condition, the fourth lens unit G4 moves to the object side along the optical axis.

The eighth lens element L8 and the ninth lens element L9 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

Embodiment 2

Figure 4:
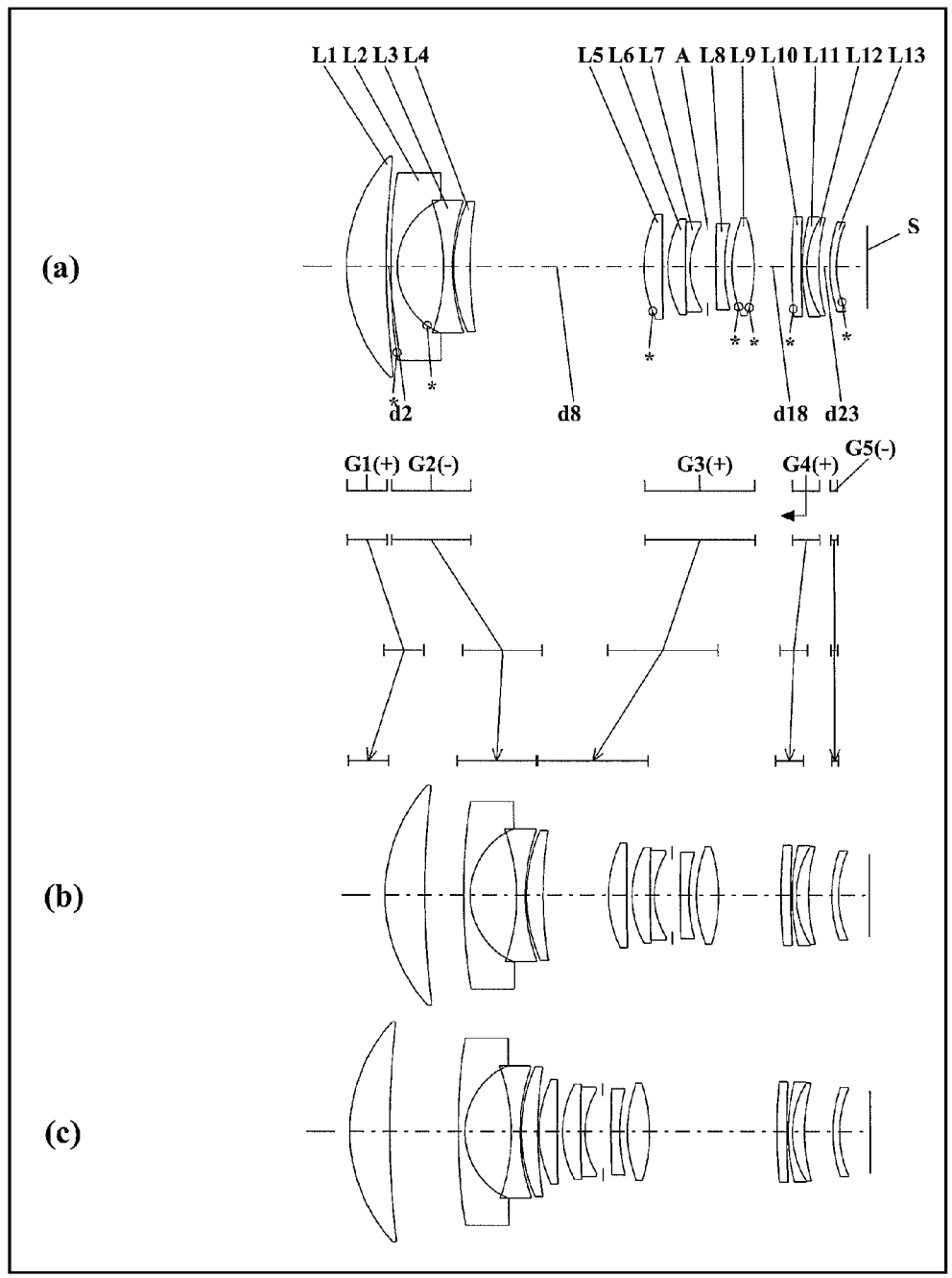
FIG. 4 is a lens arrangement diagram showing an infinity in-focus condition of a zoom lens system according to Embodiment 2 (Numerical Example 2)
Figure 5:
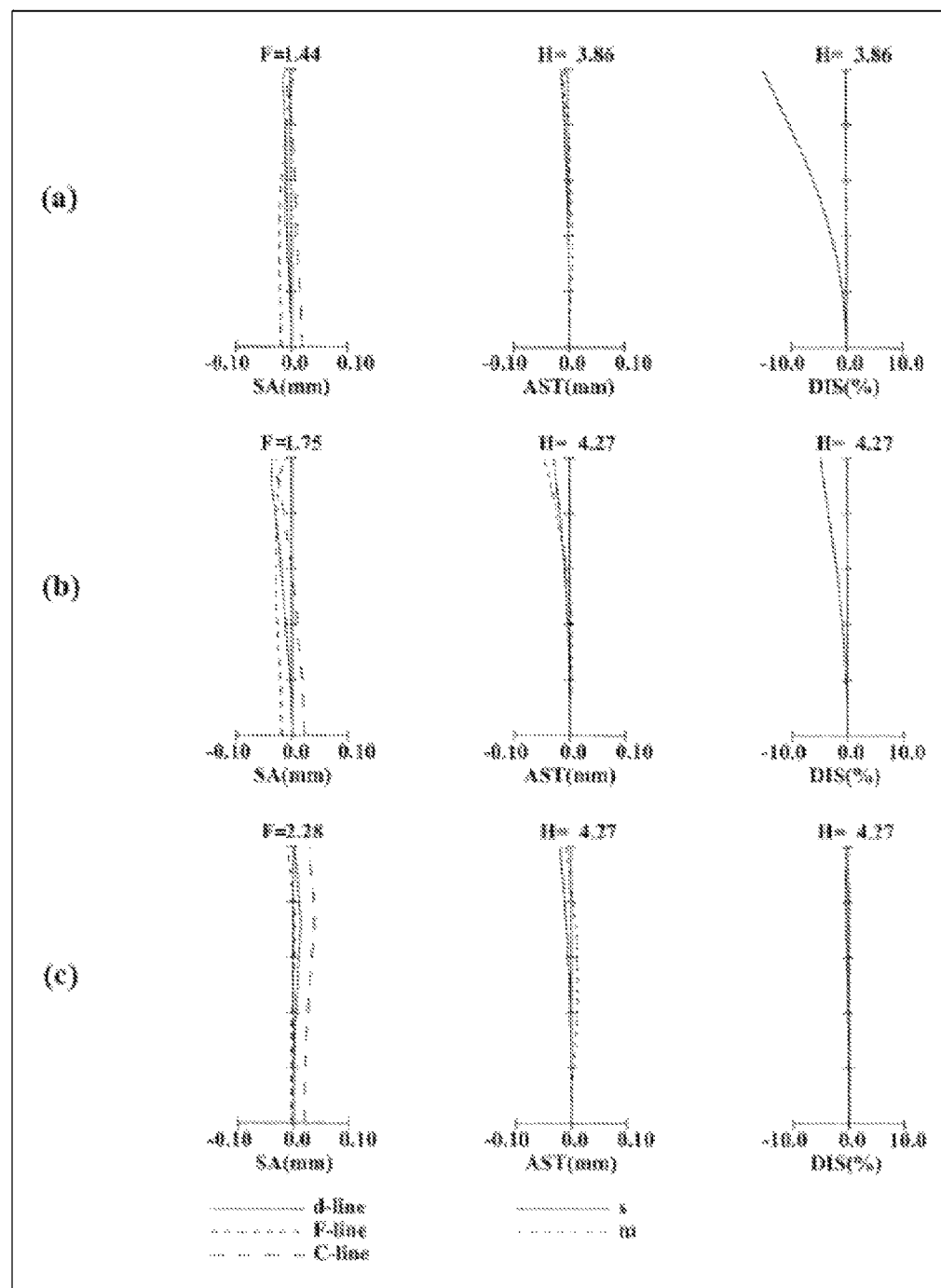
FIG. 5 is a longitudinal aberration diagram of an infinity in-focus condition of a zoom lens system according to Numerical Example 2.
Figure 6:
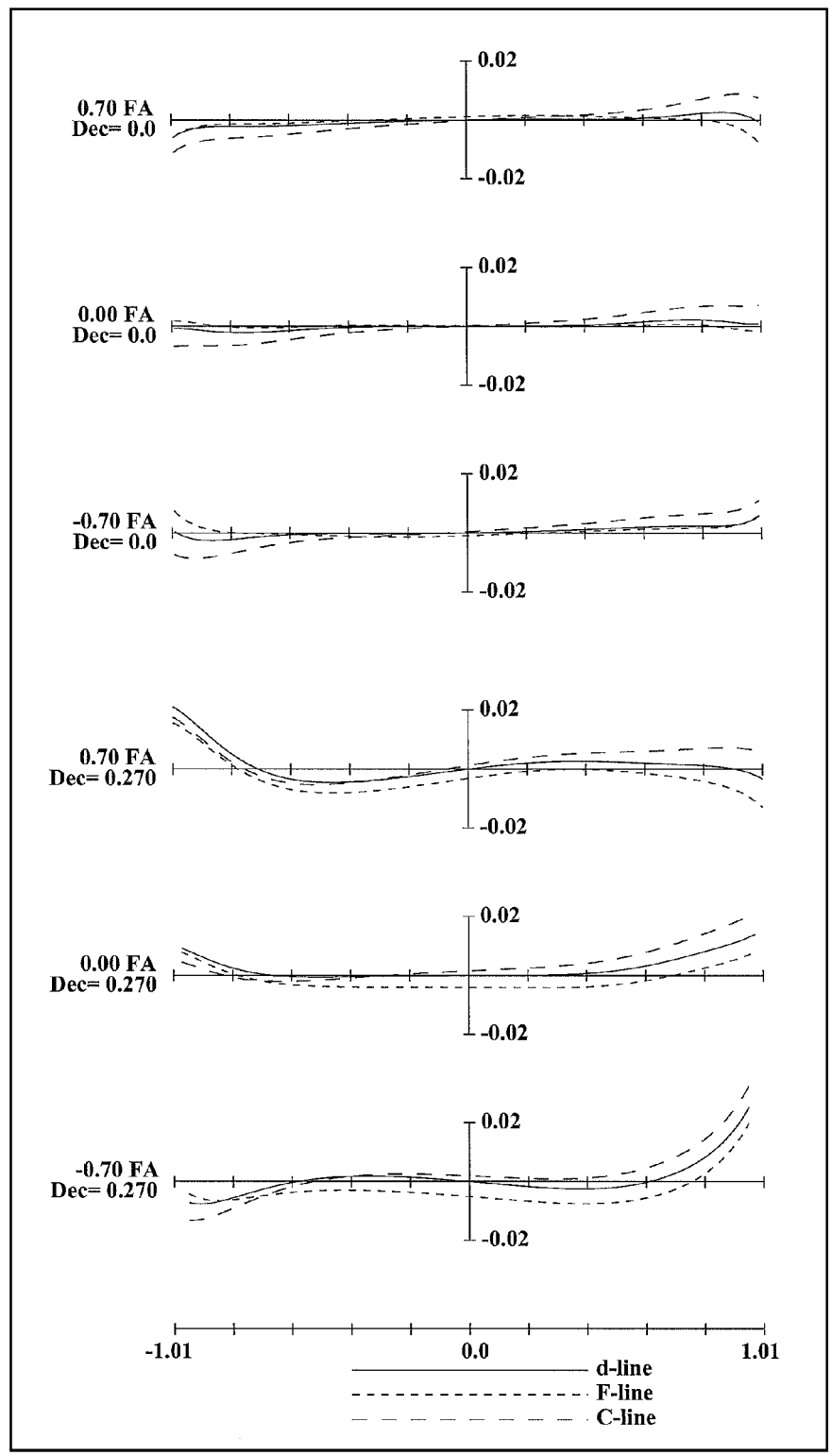
FIG. 6 is a lateral aberration diagram of a zoom lens system according to Numerical Example 2 at a telephoto limit in a basic state where image blur compensation is not performed and in an image blur compensation state.

As shown in FIG. 4, the first lens unit G1 comprises solely a positive meniscus first lens element L1 with the convex surface facing the object side.

The second lens unit G2, in order from the object side to the image side, comprises: a negative meniscus second lens element L2 with the convex surface facing the object side; a bi-concave third lens element L3; and a positive meniscus fourth lens element L4 with the convex surface facing the object side. The second lens element L2 has two aspheric surfaces.

The third lens unit G3, in order from the object side to the image side, comprises: a positive meniscus fifth lens element L5 with the convex surface facing the object side; a positive meniscus sixth lens element L6 with the convex surface facing the object side; a negative meniscus seventh lens element L7 with the convex surface facing the object side; an aperture diaphragm A, a negative meniscus eighth lens element L8 with the convex surface facing the object side; and a bi-convex ninth lens element L9. Among these, the sixth lens element L6 and the seventh lens element L7 are cemented with each other. The fifth lens element L5 has an aspheric object side surface. The ninth lens element L9 has two aspheric surfaces.

The fourth lens unit G4, in order from the object side to the image side, comprises: a positive meniscus tenth lens element L10 with the convex surface facing the object side; a negative meniscus eleventh lens element L11 with the convex surface facing the object side; and a positive meniscus twelfth lens element L12 with the convex surface facing the object side. Among these, the eleventh lens element L11 and the twelfth lens element L12 are cemented with each other. The tenth lens element L10 has an aspheric object side surface.

The fifth lens unit G5 comprises solely a negative meniscus thirteenth lens element L13 with the convex surface facing the object side. The thirteenth lens element L13 has an aspheric image side surface.

In zooming from a wide-angle limit to a telephoto limit at the time of image taking, the first lens unit G1 moves with locus of a convex to the image side, the second lens unit G2 moves to the image side, the third lens unit G3 moves to the object side, the fourth lens unit G4 moves to the object side, and the fifth lens unit G5 does not move. That is, in zooming, the first lens unit G1, the second lens unit G2, the third lens unit G3, and the fourth lens unit G4 individually move along the optical axis, and the fifth lens unit G5 is fixed with respect to the image surface S, so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 increases.

In focusing from an infinity in-focus condition to a close-object in-focus condition, the fourth lens unit G4 moves to the object side along the optical axis.

The eighth lens element L8 and the ninth lens element L9 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

Embodiment 3

Figure 7:
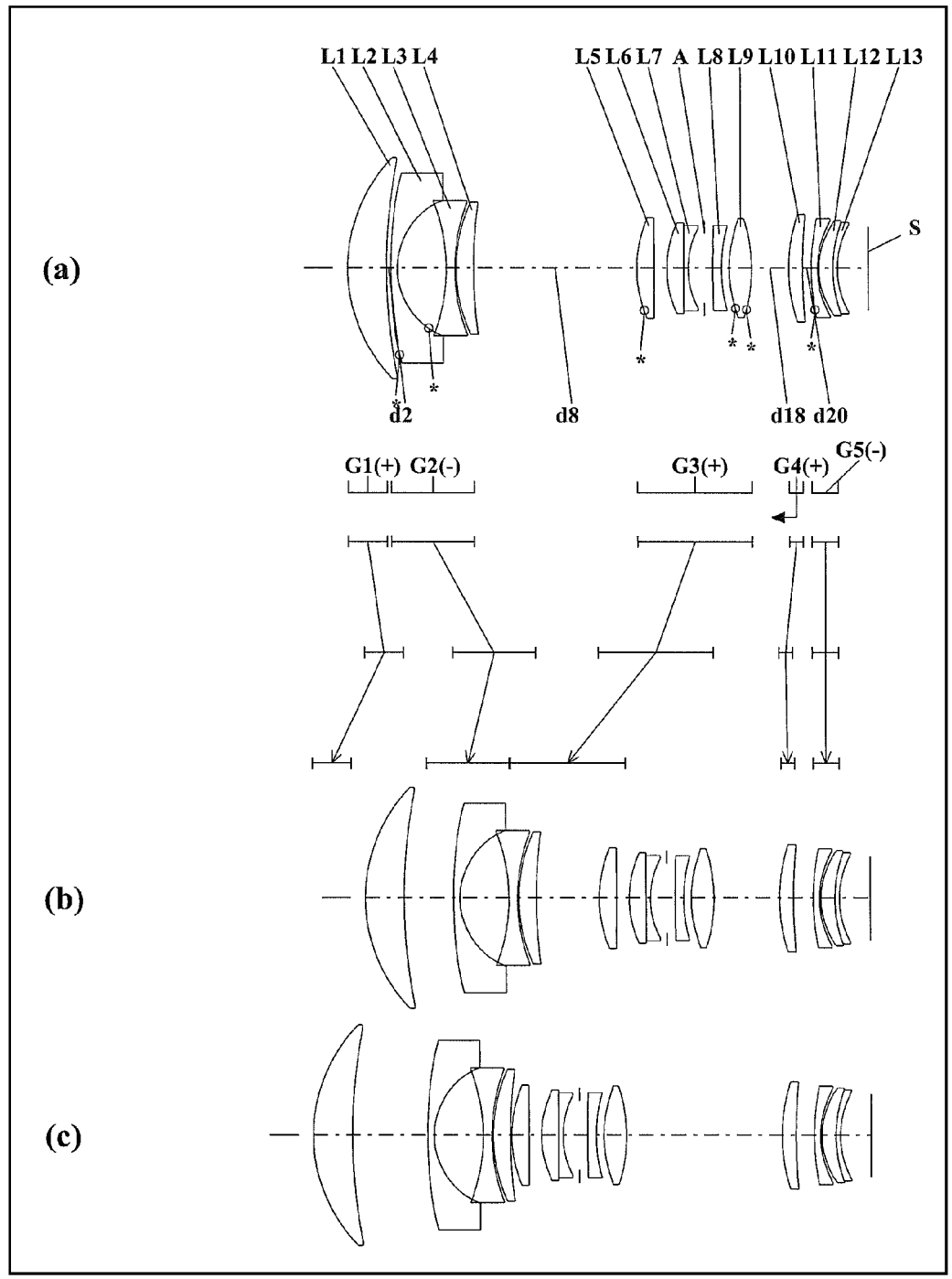
FIG. 7 is a lens arrangement diagram showing an infinity in-focus condition of a zoom lens system according to Embodiment 3 (Numerical Example 3)
Figure 8:
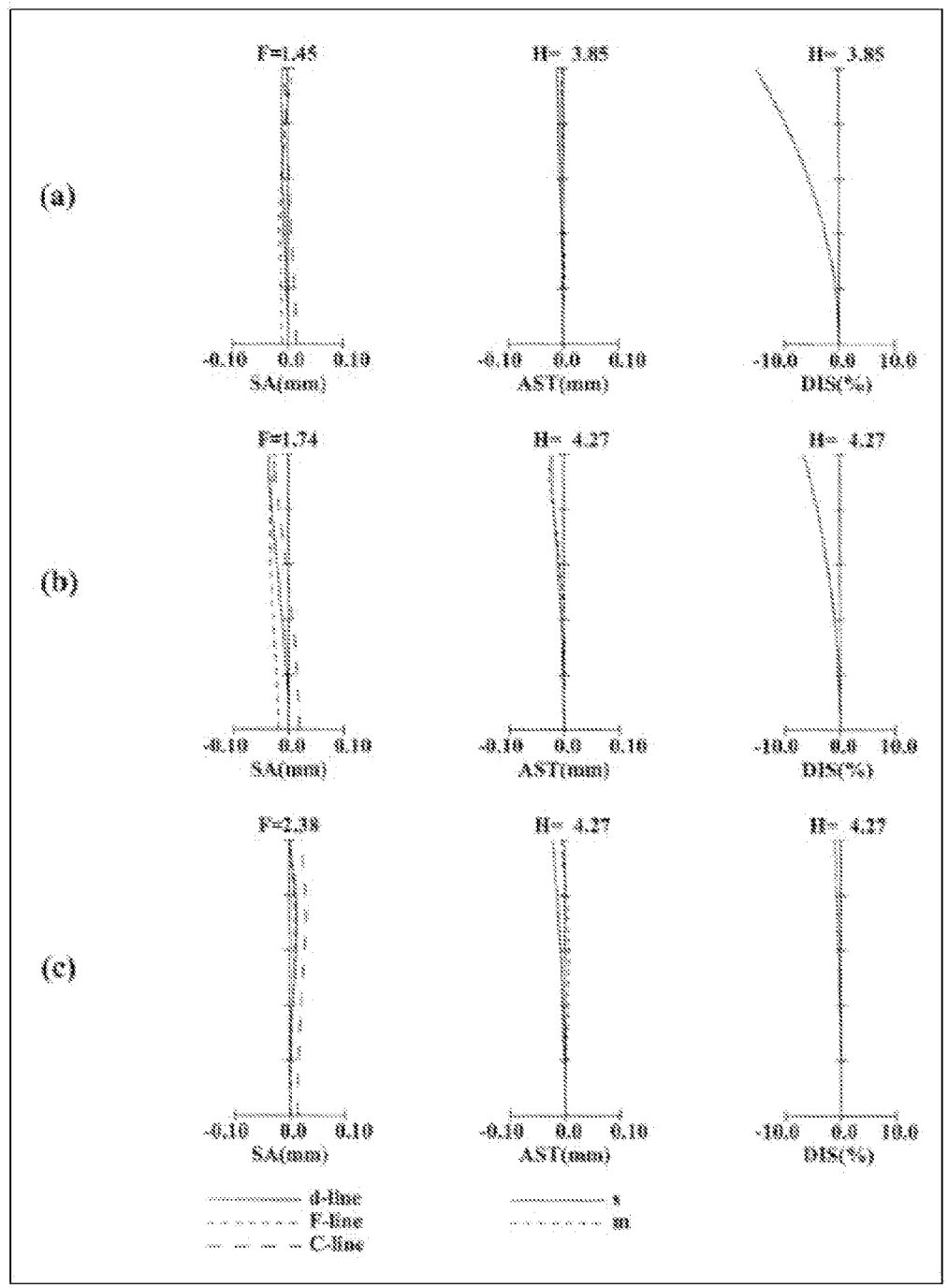
FIG. 8 is a longitudinal aberration diagram of an infinity in-focus condition of a zoom lens system according to Numerical Example 3.
Figure 9:
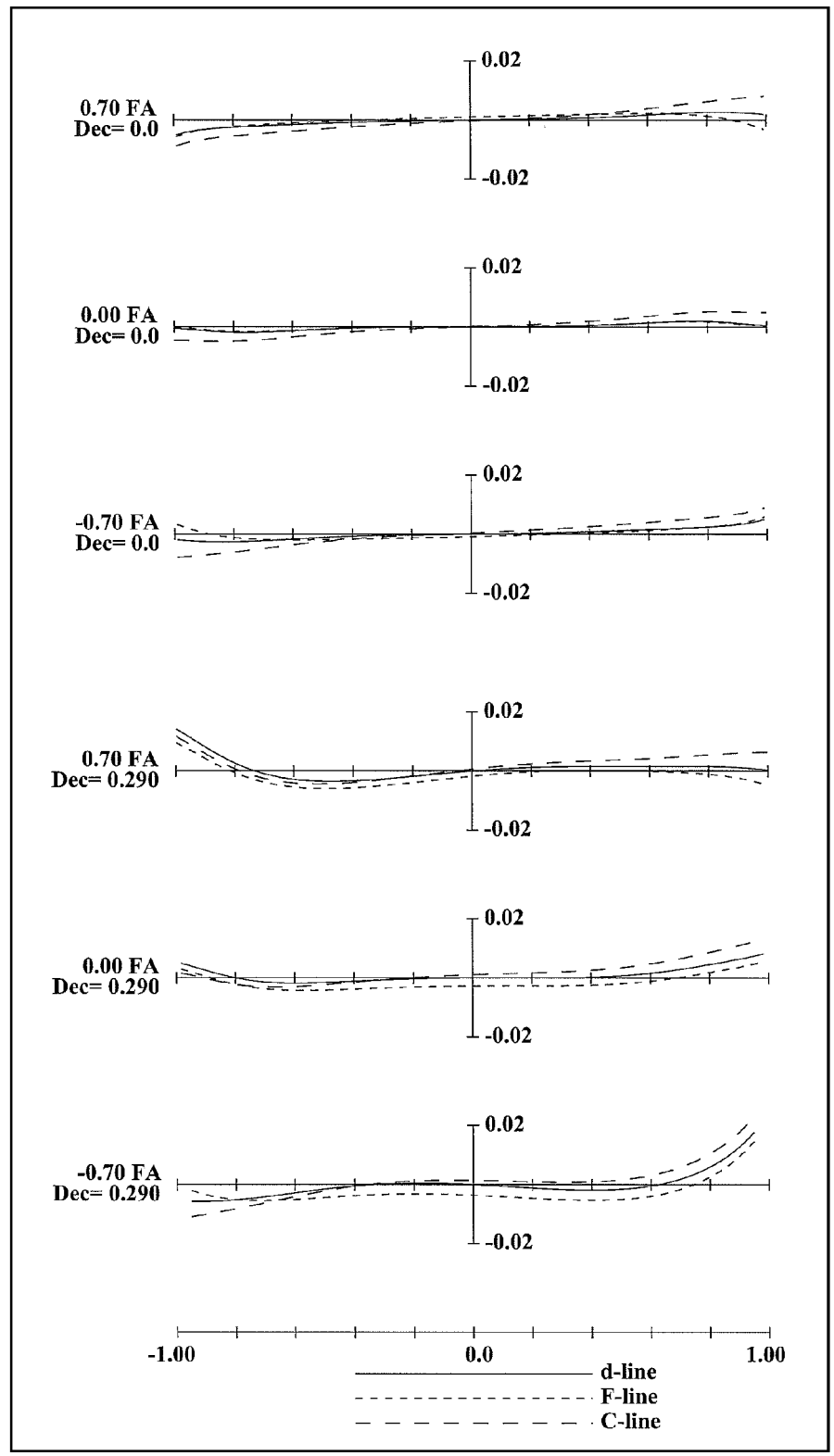
FIG. 9 is a lateral aberration diagram of a zoom lens system according to Numerical Example 3 at a telephoto limit in a basic state where image blur compensation is not performed and in an image blur compensation state.

As shown in FIG. 7, the first lens unit G1 comprises solely a positive meniscus first lens element L1 with the convex surface facing the object side.

The second lens unit G2, in order from the object side to the image side, comprises: a negative meniscus second lens element L2 with the convex surface facing the object side; a bi-concave third lens element L3; and a positive meniscus fourth lens element L4 with the convex surface facing the object side. The second lens element L2 has two aspheric surfaces.

The third lens unit G3, in order from the object side to the image side, comprises: a bi-convex fifth lens element L5; a bi-convex sixth lens element L6; a bi-concave seventh lens element L7; an aperture diaphragm A, a negative meniscus eighth lens element L8 with the convex surface facing the object side; and a bi-convex ninth lens element L9. Among these, the sixth lens element L6 and the seventh lens element L7 are cemented with each other. The fifth lens element L5 has an aspheric object side surface. The ninth lens element L9 has two aspheric surfaces.

The fourth lens unit G4 comprises solely a positive meniscus tenth lens element L10 with the convex surface facing the object side.

The fifth lens unit G5, in order from the object side to the image side, comprises: a negative meniscus eleventh lens element L11 with the convex surface facing the object side; a positive meniscus twelfth lens element L12 with the convex surface facing the object side; and a negative meniscus thirteenth lens element L13 with the convex surface facing the object side. Among these, the twelfth lens element L12 and the thirteenth lens element L13 are cemented with each other. The eleventh lens element L11 has an aspheric object side surface.

In zooming from a wide-angle limit to a telephoto limit at the time of image taking, the first lens unit G1 moves to the object side with locus of a convex to the image side, the second lens unit G2 moves to the image side, the third lens unit G3 moves to the object side, the fourth lens unit G4 moves to the object side, and the fifth lens unit G5 does not move. That is, in zooming, the first lens unit G1, the second lens unit G2, the third lens unit G3, and the fourth lens unit G4 individually move along the optical axis, and the fifth lens unit G5 is fixed with respect to the image surface S, so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 increases.

In focusing from an infinity in-focus condition to a close-object in-focus condition, the fourth lens unit G4 moves to the object side along the optical axis.

The eighth lens element L8 and the ninth lens element L9 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

Embodiment 4

As shown in FIG. 10, the first lens unit G1 comprises solely a bi-convex first lens element L1.

The second lens unit G2, in order from the object side to the image side, comprises: a negative meniscus second lens element L2 with the convex surface facing the object side; a bi-concave third lens element L3; and a bi-convex fourth lens element L4. The second lens element L2 has two aspheric surfaces.

The third lens unit G3, in order from the object side to the image side, comprises: a bi-convex fifth lens element L5; a positive meniscus sixth lens element L6 with the convex surface facing the object side; a negative meniscus seventh lens element L7 with the convex surface facing the object side; an aperture diaphragm A, a negative meniscus eighth lens element L8 with the convex surface facing the object side; and a bi-convex ninth lens element L9. Among these, the sixth lens element L6 and the seventh lens element L7 are cemented with each other. The fifth lens element L5 has two aspheric surfaces. The ninth lens element L9 has an aspheric image side surface.

The fourth lens unit G4 comprises solely a bi-convex tenth lens element L10. The tenth lens element L10 has an aspheric image side surface.

The fifth lens unit G5 comprises solely a bi-concave eleventh lens element L11. The eleventh lens element L11 has an aspheric object side surface.

In zooming from a wide-angle limit to a telephoto limit at the time of image taking, the first lens unit G1 moves to the object side with locus of a convex to the image side, the second lens unit G2 moves to the image side, the third lens unit G3 moves to the object side, the fourth lens unit G4 moves to the object side, and the fifth lens unit G5 moves to the object side. That is, in zooming, the first lens unit G1, the second lens unit G2, the third lens unit G3, the fourth lens unit G4, and the fifth lens unit G5 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 increases.

In focusing from an infinity in-focus condition to a close-object in-focus condition, the fourth lens unit G4 moves to the object side along the optical axis.

The eighth lens element L8 and the ninth lens element L9 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

Embodiment 5

As shown in FIG. 13, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other.

The second lens unit G2, in order from the object side to the image side, comprises: a negative meniscus third lens element L3 with the convex surface facing the object side; a bi-concave fourth lens element L4; a bi-convex fifth lens element L5; and a negative meniscus sixth lens element L6 with the convex surface facing the image side. The third lens element L3 has two aspheric surfaces.

The third lens unit G3, in order from the object side to the image side, comprises: a bi-convex seventh lens element L7; a positive meniscus eighth lens element L8 with the convex surface facing the object side; a negative meniscus ninth lens element L9 with the convex surface facing the object side; an aperture diaphragm A; a bi-concave tenth lens element L10; and a bi-convex eleventh lens element L11. Among these, the eighth lens element L8 and the ninth lens element L9 are cemented with each other. The seventh lens element L7 has two aspheric surfaces. The eleventh lens element L11 has two aspheric surfaces.

The fourth lens unit G4 comprises solely a positive meniscus twelfth lens element L12 with the convex surface facing the object side. The twelfth lens element L12 has two aspheric surfaces.

The fifth lens unit G5 comprises solely a negative meniscus thirteenth lens element L13 with the convex surface facing the object side. The thirteenth lens element L13 has an aspheric object side surface.

In zooming from a wide-angle limit to a telephoto limit at the time of image taking, the first lens unit G1 moves to the object side, the second lens unit G2 moves to the image side, the third lens unit G3 moves to the object side, the fourth lens unit G4 moves to the object side, and the fifth lens unit G5 does not move. That is, in zooming, the first lens unit G1, the second lens unit G2, the third lens unit G3, and the fourth lens unit G4 individually move along the optical axis, and the fifth lens unit G5 is fixed with respect to the image surface S, so that the interval between the first lens unit G1 and the second lens unit G2 increases, the interval between the second lens unit G2 and the third lens unit G3 decreases, the interval between the third lens unit G3 and the fourth lens unit G4 increases, and the interval between the fourth lens unit G4 and the fifth lens unit G5 increases.

In focusing from an infinity in-focus condition to a close-object in-focus condition, the fourth lens unit G4 moves to the object side along the optical axis.

The tenth lens element L10 and the eleventh lens element L11 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

Embodiment 6

Figure 16:
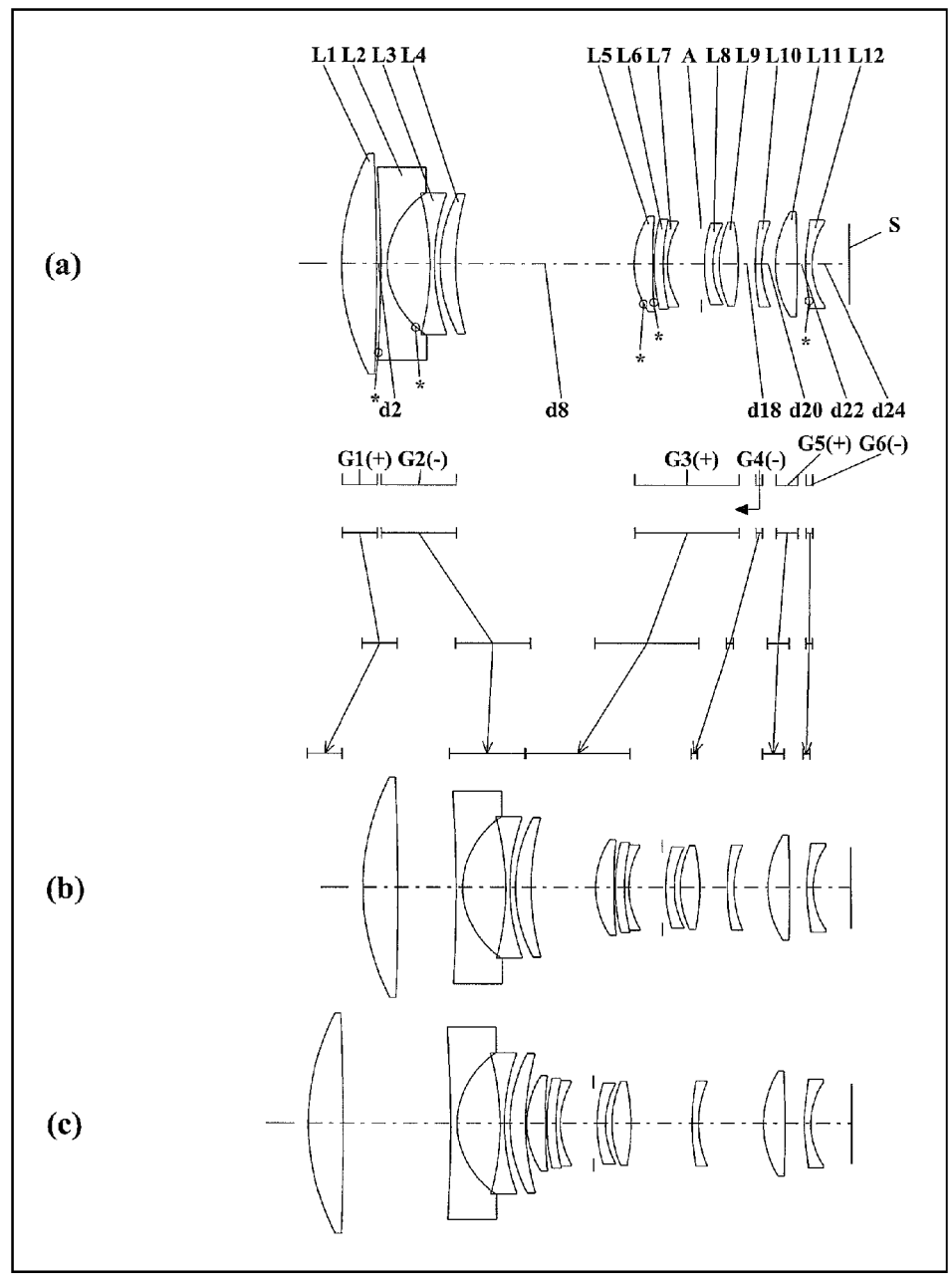
FIG. 16 is a lens arrangement diagram showing an infinity in-focus condition of a zoom lens system according to Embodiment 6 (Numerical Example 6)
Figure 17:
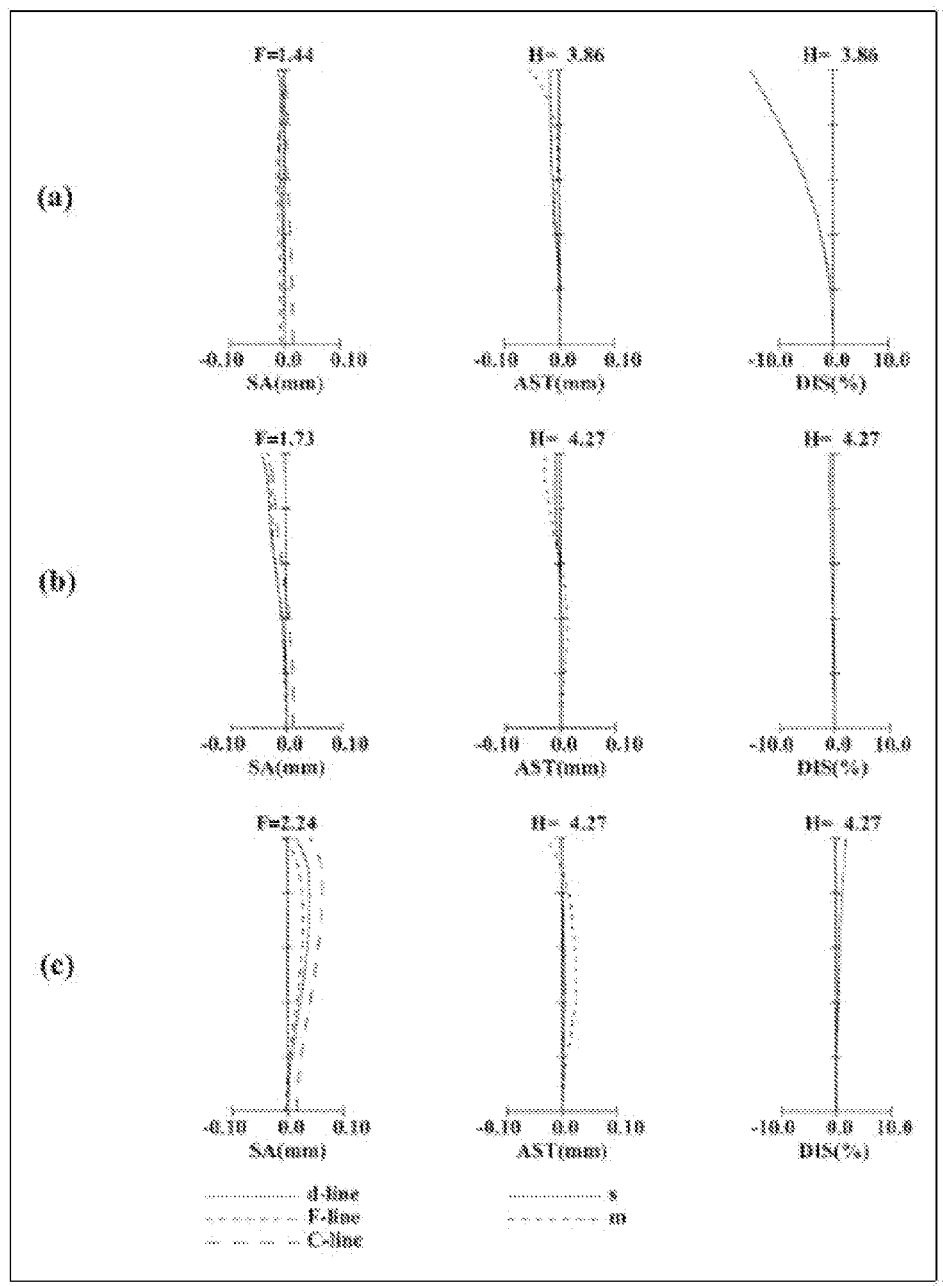
FIG. 17 is a longitudinal aberration diagram of an infinity in-focus condition of a zoom lens system according to Numerical Example 6.
Figure 18:
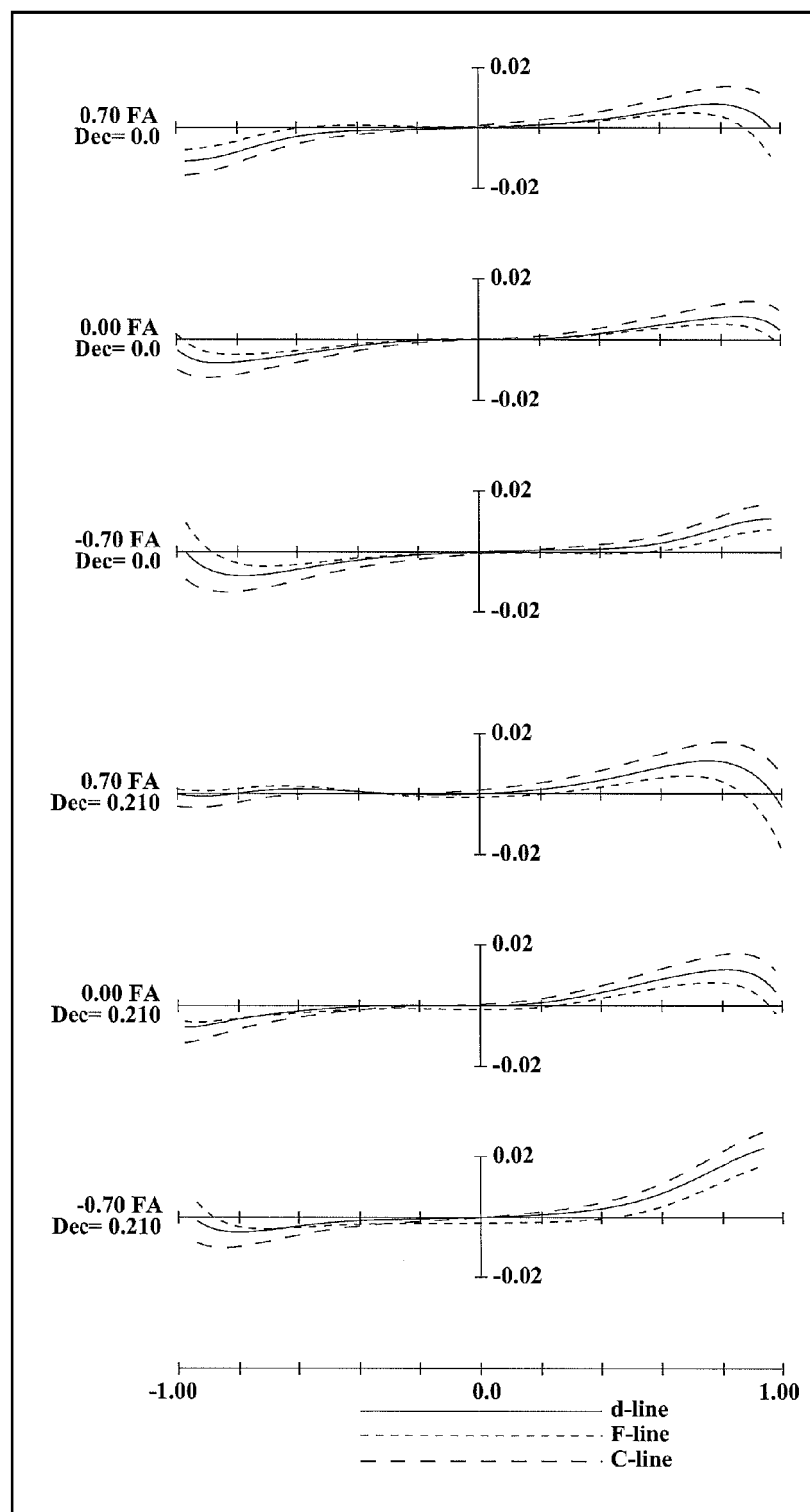
FIG. 18 is a lateral aberration diagram of a zoom lens system according to Numerical Example 6 at a telephoto limit in a basic state where image blur compensation is not performed and in an image blur compensation state.

As shown in FIG. 16, the first lens unit G1 comprises solely a bi-convex first lens element L1.

The second lens unit G2, in order from the object side to the image side, comprises: a bi-concave second lens element L2; a bi-concave third lens element L3; and a positive meniscus fourth lens element L4 with the convex surface facing the object side. The second lens element L2 has two aspheric surfaces.

The third lens unit G3, in order from the object side to the image side, comprises: a positive meniscus fifth lens element L5 with the convex surface facing the object side; a negative meniscus sixth lens element L6 with the convex surface facing the object side; a negative meniscus seventh lens element L7 with the convex surface facing the object side; an aperture diaphragm A, a negative meniscus eighth lens element L8 with the convex surface facing the object side; and a bi-convex ninth lens element L9. Among these, the sixth lens element L6 and the seventh lens element L7 are cemented with each other. The fifth lens element L5 has two aspheric surfaces.

The fourth lens unit G4 comprises solely a negative meniscus tenth lens element L10 with the convex surface facing the object side.

The fifth lens unit G5 comprises solely a bi-convex eleventh lens element L11.

The sixth lens unit G6 comprises solely a negative meniscus twelfth lens element L12 with the convex surface facing the object side. The twelfth lens element L12 has an aspheric object side surface.

In zooming from a wide-angle limit to a telephoto limit at the time of image taking, the first lens unit G1 moves to the object side with locus of a convex to the image side, the second lens unit G2 moves to the image side, the third lens unit G3 moves to the object side, the fourth lens unit G4 moves to the object side, the fifth lens unit G5 moves to the object side, and the sixth lens unit G6 moves to the object side. That is, in zooming, the first lens unit G1, the second lens unit G2, the third lens unit G3, the fourth lens unit G4, the fifth lens unit G5, and the sixth lens unit G6 individually move along the optical axis so that the interval between the first lens unit G1 and the second lens unit G2 increases, the interval between the second lens unit G2 and the third lens unit G3 decreases, the interval between the third lens unit G3 and the fourth lens unit G4 increases, the interval between the fourth lens unit G4 and the fifth lens unit G5 increases, and the interval between the fifth lens unit G5 and the sixth lens unit G6 increases.

In focusing from an infinity in-focus condition to a close-object in-focus condition, the fourth lens unit G4 moves to the object side along the optical axis.

The eighth lens element L8 and the ninth lens element L9 which are components of the third lens unit G3 correspond to an image blur compensating lens unit described later. By moving these two lens elements together in a direction perpendicular to the optical axis, image point movement caused by vibration of the entire system can be compensated, that is, image blur caused by hand blur, vibration, and the like can be compensated optically.

As described above, Embodiments 1 to 6 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that a zoom lens system like the zoom lens systems according to Embodiments 1 to 6 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 6, having a plurality of lens units, each lens unit being composed of at least one lens element, and in order from an object side to an image side, comprising: a first lens unit having positive optical power; a second lens unit having negative optical power; a third lens unit having positive optical power; a fourth lens unit; and at least one subsequent lens unit, in which the subsequent lens unit(s) includes a lens unit having negative optical power, the first lens unit is composed of two or less lens elements, the third lens unit is composed of four or more lens elements, and in zooming from a wide-angle limit to a telephoto limit at the time of image taking, the first lens unit and the second lens unit move along an optical axis (this lens configuration is referred to as a basic configuration of the embodiments, hereinafter), the following condition (1) is satisfied:

$$0<|f_W/f_e|<2 \tag{1}$$

where, $f_e$ is a focal length of a lens unit having negative optical power and located closest to the image side in the entire system, and $f_W$ is a focal length of the entire system at a wide-angle limit.

The condition (1) sets forth the relationship between the focal length of the lens unit having negative optical power and located closest to the image side in the entire system, and the focal length of the entire system at the wide-angle limit. When the value exceeds the upper limit of the condition (1), the focal length of the lens unit having negative optical power and located closest to the image side in the entire system is reduced, and thereby the image surface is likely to fall to the over side, which makes it difficult to ensure flatness of the image surface.

When the following condition (1)' is satisfied, the above-mentioned effect is achieved more successfully.

$$0<|f_W/f_e|<1 \tag{1}'$$

When the following condition (1)" is further satisfied, the above-mentioned effect is achieved more successfully.

$$0<|f_W/f_e|<0.7 \tag{1}''$$

It is beneficial that, in a zoom lens system having the basic configuration like the zoom lens systems according to Embodiments 1 to 6, the second lens unit includes at least one lens element having positive optical power, and the following conditions (2) and (3) are satisfied:

$$n_{2p}>1.8 \tag{2}$$

$$v_{2p}<24 \tag{3}$$

where, $n_{2p}$ is an average of refractive indices to the d-line of the lens element(s) having positive optical power and constituting the second lens unit, and $v_{2p}$ is an average of Abbe numbers to the d-line of the lens element(s) having positive optical power and constituting the second lens unit.

The conditions (2) and (3) set forth the average of refractive indices to the d-line and the average of Abbe numbers to the d-line, of the lens element(s) having positive optical power and constituting the second lens unit, respectively. When the value goes below the lower limit of the condition (2), the focal length of the lens element(s) having positive optical power is increased, and thereby the action of the entire second lens unit to cause the image surface to fall to the over side becomes excessively great, which makes it difficult to ensure flatness of the image surface particularly at the wide-angle side. When the value exceeds the upper limit of the condition (3), it becomes difficult to compensate chromatic aberration that occurs in a lens element having negative optical power and included in the second lens unit.

When the following conditions (2)' and (3)' are satisfied, the above-mentioned effect is achieved more successfully.

$$n_{2p}>1.9 \tag{2}'$$

$$v_{2p}<22 \tag{3}'$$

When the following conditions (2)" and (3)" are further satisfied, the above-mentioned effect is achieved more successfully.

$$n_{2p}>1.95 \tag{2}''$$

$$v_{2p}<19 \tag{3}''$$

It is beneficial that a zoom lens system having the basic configuration like the zoom lens systems according to Embodiments 1 to 6 satisfies the following condition (4).

$$0.5<L_{G3}/(f_T\times\tan(\omega_T))<10 \tag{4}$$

where, $L_{G3}$ is an optical axial thickness of the third lens unit, $f_T$ is a focal length of the entire system at a telephoto limit, and $\omega_T$ is a half view angle (°) at the telephoto limit.

The condition (4) sets forth the relationship among the optical axial thickness of the third lens unit, the focal length of the entire system at the telephoto limit, and the half view angle at the telephoto limit. When the value goes below the lower limit of the condition (4), each interval between adjacent lens elements in the third lens unit is reduced, which makes it difficult to compensate curvature of field particularly at the telephoto limit. Further, the degree of deterioration of performance with an error in the interval between lens elements is increased, which makes assembly of the optical system difficult. When the value exceeds the upper limit of the condition (4), the optical axial thickness of the third lens unit is increased, and thereby the thickness of the entire optical system is also increased.

When at least one of the following conditions (4-1)' and (4-2)' is satisfied, the above-mentioned effect is achieved more successfully.

$$1.5<L_{G3}/(f_T\times\tan(\omega_T)) \tag{4-1}'$$

$$L_{G3}/(f_T\times\tan(\omega_T))<8 \tag{4-2}'$$

When at least one of the following conditions (4-1)" and (4-2)" is further satisfied, the above-mentioned effect is achieved more successfully.

$$2.0<L_{G3}/(f_T\times\tan(\omega_T)) \tag{4-1}''$$

$$L_{G3}/(f_T\times\tan(\omega_T))<6 \tag{4-2}''$$

It is beneficial that, in a zoom lens system having the basic configuration like the zoom lens systems according to Embodiments 1 to 3 and 5, at least one of the subsequent lens unit(s) is fixed with respect to the image surface in zooming from a wide-angle limit to a telephoto limit at the time of image taking, and the following condition (5) is satisfied.

$$0.05 < \Delta F/(f_T \times \tan(\omega_T)) \quad (5)$$

where, $\Delta F$ is a minimum value of an axial interval between the lens unit fixed with respect to the image surface, and a lens unit adjacent to the lens unit fixed with respect to the image surface, $f_T$ is a focal length of the entire system at a telephoto limit, and $\omega_T$ is a half view angle (°) at the telephoto limit.

The condition (5) sets forth the minimum value of the axial interval between the lens unit fixed with respect to the image surface in zooming, and a lens unit adjacent to the lens unit fixed with respect to the image surface. When the value goes below the lower limit of the condition (5), since the minimum value of the interval becomes excessively small, a space for the lens unit fixed with respect to the image surface in zooming to prevent the lens units which move in zooming from physically interfering becomes extremely small.

When the following condition (5)' is satisfied, the above-mentioned effect is achieved more successfully.

$$0.05 < \Delta F/(f_T \times \tan(\omega_T)) < 4 \quad (5)'$$

When the value exceeds the upper limit of the condition (5)', the above-mentioned minimum value of the interval becomes excessively large. As a result, the overall length of the optical system becomes long, and thereby the optical system is increased in size.

When at least one of the following conditions (5-1)" and (5-2)" is further satisfied, the above-mentioned effect is achieved more successfully.

$$0.10 < \Delta F/(f_T \times \tan(\omega_T)) \quad (5\text{-}1)''$$

$$\Delta F/(f_T \times \tan(\omega_T)) < 2 \quad (5\text{-}2)''$$

It is beneficial for a zoom lens system to be provided with an image blur compensating lens unit which moves in a direction perpendicular to the optical axis in order to optically compensate image blur, like the zoom lens systems according to Embodiments 1 to 6. By virtue of the image blur compensating lens unit, image point movement caused by vibration of the entire system can be compensated.

When compensating image point movement caused by vibration of the entire system, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit may be the entirety of any one of the lens units constituting the lens system, or may be a sub lens unit constituting a part of any one of the lens units constituting the lens system. The sub lens unit may be a single lens element, or a plurality of adjacent lens elements.

It is beneficial that the first lens unit moves with locus of a convex to the image side in zooming from a wide-angle limit to a telephoto limit at the time of image taking, like the zoom lens systems according to Embodiments 1 to 4 and 6. Since the first lens unit moves with locus of a convex to the image side, the interval between the first lens unit and the second lens unit is reduced at an intermediate zoom position between the wide-angle limit and the telephoto limit. Therefore, it is easy to ensure an amount of peripheral light even when the optical system is small.

It is beneficial that the lens unit located closest to the image side in the entire system is composed of three or less lens elements, like the zoom lens systems according to Embodiments 1 to 6. Since the lens unit located closest to the image side in the entire system is composed of three or less lens elements, the thickness of the lens unit can be reduced. Therefore, it is easy to achieve size-reduction of the optical system, and it is easy to ensure flatness of the image surface.

Furthermore, when the lens unit located closest to the image side in the entire system is composed of one lens element, the thickness of the lens unit can be further reduced. Therefore, size-reduction of the optical system is further facilitated.

It is beneficial that the lens unit located second closest to the image side in the entire system is composed of three or less lens elements, like the zoom lens systems according to Embodiments 1 to 6. Since the lens unit located second closest to the image side in the entire system is composed of three or less lens elements, the thickness of the lens unit can be reduced. Therefore, it is easy to achieve size-reduction of the optical system, and it is easy to ensure flatness of the image surface.

Furthermore, when the lens unit located second closest to the image side in the entire system is composed of one lens element, the thickness of the lens unit can be further reduced. Therefore, size-reduction of the optical system is further facilitated.

It is beneficial that at least one of the subsequent lens unit(s) is fixed with respect to the image surface in zooming from a wide-angle limit to a telephoto limit at the time of image taking, like the zoom lens systems according to Embodiments 1 to 3 and 5. When all the lens units move with respect to the image surface in zooming, the configuration of the drive mechanism for the lens units is enlarged, which makes it difficult to provide a compact lens barrel, imaging device, and camera.

When the lens unit located closest to the image side in the entire system is fixed with respect to the image surface, it is easy to improve the positional accuracy with respect to the image surface, and adjustment in assembly of the optical system is facilitated.

It is beneficial that an aperture diaphragm which adjusts the amount of light is further provided, the aperture diaphragm is located on the image side relative to the second lens unit, and is located between lens elements, an air space between which does not vary in zooming from a wide-angle limit to a telephoto limit at the time of image taking, like the zoom lens systems according to Embodiments 1 to 6. When the aperture diaphragm is located on the object side relative to the second lens unit, the diameter of the aperture diaphragm is enlarged, which makes it difficult to provide a compact lens barrel, imaging device, and camera.

Further, when the aperture diaphragm is located on the image side relative to an air space between a lens element and a lens element, which constitute the third lens unit, the aperture diaphragm is located on the side where the light beam is more condensed in the optical system. Therefore, reduction in the diameter of the aperture diaphragm is realized, which makes it easy to provide a compact lens barrel, imaging device, and camera.

It is beneficial that the fourth lens unit has positive optical power, and the fifth lens unit having negative optical power is provided as the subsequent lens unit on the image side of the fourth lens unit, like the zoom lens systems according to Embodiments 1 to 5. Since the fifth lens unit has negative optical power, the optical system located on the object side relative to the fifth lens unit can be reduced in size. In addition, since the fourth lens unit has positive optical power, the balance of aberration is improved.

It is beneficial that the fourth lens unit has negative optical power, and the fifth lens unit having positive optical power and the sixth lens unit having negative optical power are provided in this order, as the subsequent lens units on the image side of the fourth lens unit, like the zoom lens system according to Embodiment 6. Since the sixth lens unit has negative optical power, the optical system located on the object side relative to the sixth lens unit can be reduced in size. In addition, since the fourth lens unit has negative optical power, the fifth lens unit has positive optical power, and the sixth lens unit has negative optical power, the balance of aberration is improved.

Each of the lens units constituting the zoom lens system according to any of Embodiments 1 to 6 is composed exclusively of refractive type lens elements that deflect the incident light by refraction (that is, lens elements of a type in which deflection is achieved at the interface between media each having a distinct refractive index). However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is beneficial.

Embodiment 7

Figure 19:
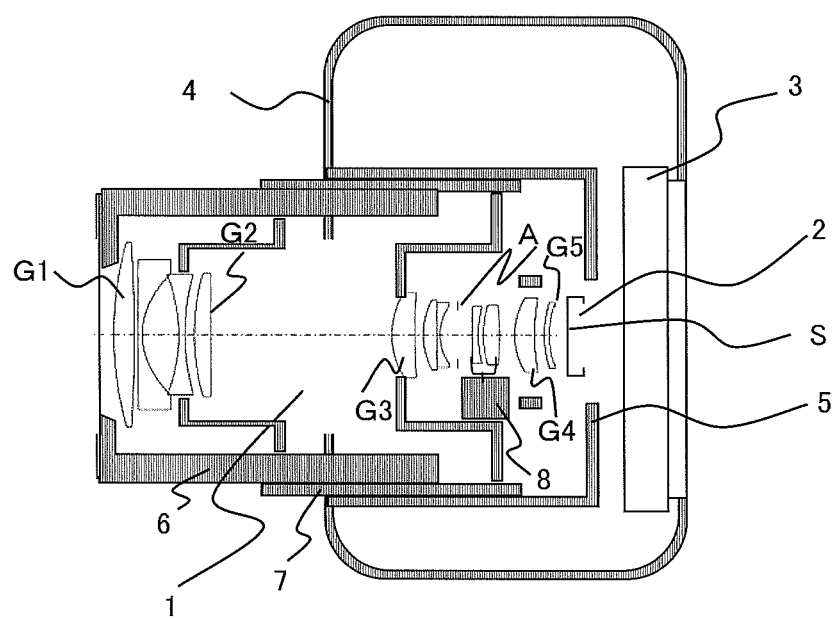
FIG. 19 is a schematic construction diagram of a digital still camera according to Embodiment 7.

FIG. 19 is a schematic construction diagram of a digital still camera according to Embodiment 7. In FIG. 19, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 19, the zoom lens system 1, in order from the object side to the image side, comprises a first lens unit G1, a second lens unit G2, a third lens unit G3 having an aperture diaphragm A, a fourth lens unit G4, and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 having the aperture diaphragm A, the fourth lens unit G4, and the fifth lens unit G5 move to predetermined positions relative to the image sensor 2, so that zooming from a wide-angle limit to a telephoto limit is achieved. The fourth lens unit G4 is movable in an optical axis direction by a motor for focus adjustment.

In image blur compensation, a sub lens unit as an image blur compensating lens unit, which consists of a part of the third lens unit G3, moves in a direction perpendicular to the optical axis by a motor 8 for image blur compensating lens, and thereby image point movement caused by vibration of the entire system can be compensated.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 19, any one of the zoom lens systems according to Embodiments 2 to 6 may be employed in place of the zoom lens system according to Embodiment 1. Further, the optical system of the digital still camera shown in FIG. 19 is applicable also to a digital video camera for moving images. In this case, moving images with high resolution can be acquired in addition to still images.

Here, the digital still camera according to the present Embodiment 7 has been described for a case that the employed zoom lens system 1 is a zoom lens system according to Embodiments 1 to 6. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 6.

Further, Embodiment 7 has been described for a case that the zoom lens system is applied to a lens barrel of so-called barrel retraction construction. However, the present disclosure is not limited to this. For example, the zoom lens system may be applied to a lens barrel of so-called bending configuration where a prism having an internal reflective surface or a front surface reflective mirror is arranged at an arbitrary position between the second lens unit G2 and the third lens unit G3, or the like.

As described above, Embodiment 7 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

An imaging device comprising each of the zoom lens systems according to Embodiments 1 to 6, and an image sensor such as a CCD or a CMOS may be applied to a camera for a mobile terminal device such as a smart-phone, a surveillance camera in a surveillance system, a Web camera, a vehicle-mounted camera or the like.

The following description is given for numerical examples in which the zoom lens system according to Embodiments 1 to 6 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14, and 17 are longitudinal aberration diagrams of an infinity in-focus condition of the zoom lens systems according to Numerical Examples 1 to 6, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, and 18 are lateral aberration diagrams of the zoom lens systems at a telephoto limit according to Numerical Examples 1 to 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each numerical example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.350 |
| 2 | 0.270 |
| 3 | 0.290 |
| 4 | 0.310 |
| 5 | 0.900 |
| 6 | 0.210 |

With respect to the zoom lens systems according to Numerical Examples 1 to 4 and 6, when the shooting distance is infinity, at a telephoto limit, the amount of image decentering in a case that the zoom lens system inclines by 0.6° is equal to the amount of image decentering in a case that the image blur compensating lens unit displaces in parallel by each of the above-mentioned values in a direction perpendicular to the optical axis. With respect to the zoom lens system according to Numerical Example 5, when the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.6° without degrading the imaging characteristics in the zoom lens systems according to Numerical Examples 1 to 4 and 6. Also, at arbitrary zoom positions, sufficient image blur compensation can be performed for image blur compensation angles up to 0.3° without degrading the imaging characteristics in the zoom lens system according to Numerical Example 5.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data.

TABLE 1

| (Surface data) | | | | |
|---|---|---|---|---|
| Surface number | r | d | nd | vd |
| Object surface | ∞ | | | |
| 1 | 52.20100 | 3.14200 | 1.48749 | 70.4 |
| 2 | −228.85200 | Variable | | |
| 3* | 237.63100 | 0.75000 | 1.88202 | 37.2 |
| 4* | 10.92400 | 5.58600 | | |
| 5 | −24.52700 | 0.95100 | 1.48842 | 81.7 |
| 6 | 35.11000 | 1.40000 | | |

TABLE 1-continued (Surface data)

| Surface number | r | d | nd | vd |
|---|---|---|---|---|
| 7 | 33.21600 | 2.50000 | 2.00272 | 19.3 |
| 8 | 930.31200 | Variable | | |
| 9* | 12.55400 | 3.50000 | 1.86836 | 41.6 |
| 10* | 247.24000 | 1.27200 | | |
| 11 | 11.29200 | 2.05800 | 1.72769 | 53.6 |
| 12 | 271.35800 | 0.50000 | 1.81560 | 22.6 |
| 13 | 7.59100 | 2.67900 | | |
| 14 (Diaphragm) | ∞ | 2.22100 | | |

TABLE 1-continued (Surface data)

| Surface number | r | d | nd | vd |
|---|---|---|---|---|
| 15 | 351.35800 | 1.00000 | 1.66688 | 29.7 |
| 16 | 17.59000 | 0.75000 | | |
| 17 | 15.11100 | 2.50000 | 1.72500 | 54.0 |
| 18* | −38.41500 | Variable | | |
| 19 | 11.34000 | 3.00000 | 1.69548 | 55.9 |
| 20* | 30.13800 | Variable | | |
| 21* | 15.88600 | 0.75000 | 1.88938 | 37.9 |
| 22 | 13.58700 | (BF) | | |
| Image surface | ∞ | | | |

TABLE 2

(Aspherical data)

Surface No. 3

$K = 0.00000E+00, A4 = -1.60161E-05, A6 = 1.35741E-07, A8 = -1.01182E-09$
$A10 = 2.89791E-12$
Surface No. 4

$K = 0.00000E+00, A4 = -5.90365E-05, A6 = -4.14701E-07, A8 = 4.28540E-09$
$A10 = -7.68639E-11$
Surface No. 9

$K = 9.26923E-02, A4 = -1.70140E-05, A6 = 9.77899E-07, A8 = -2.27301E-08$
$A10 = 6.05659E-10$
Surface No. 10

$K = 0.00000E+00, A4 = 7.12689E-05, A6 = 1.10909E-06, A8 = -1.92216E-08$
$A10 = 7.96891E-10$
Surface No. 18

$K = 0.00000E+00, A4 = 3.55157E-05, A6 = 7.63891E-07, A8 = -3.54067E-08$
$A10 = 8.48322E-10$
Surface No. 20

$K = 0.00000E+00, A4 = -1.05553E-04, A6 = 7.26019E-06, A8 = -2.35521E-07$
$A10 = 3.25007E-09$
Surface No. 21

$K = 0.00000E+00, A4 = -3.32833E-04, A6 = 1.87418E-05, A8 = -5.98809E-07$
$A10 = 9.07556E-09$

TABLE 3

(Various data)

Zooming ratio 3.79975

| | Wide-angle limit | Middle position | Telephoto limit |
|---|---|---|---|
| Focal length | 4.8701 | 9.4812 | 18.5051 |
| F-number | 1.44190 | 1.83212 | 2.50051 |
| View angle | 42.7088 | 24.7431 | 12.9869 |
| Image height | 3.8300 | 4.2700 | 4.2700 |
| Overall length of lens system | 69.2443 | 65.6576 | 74.7648 |
| BF | 2.63253 | 2.63253 | 2.63253 |
| d2 | 0.5000 | 8.9454 | 18.2293 |
| d8 | 27.7559 | 10.3818 | 1.0006 |
| d18 | 2.2969 | 7.0241 | 15.9677 |
| d20 | 1.5000 | 2.1043 | 2.3765 |
| Entrance pupil position | 15.1523 | 26.6487 | 43.0718 |
| Exit pupil position | −12.7724 | −22.3942 | −65.6836 |
| Front principal points position | 18.4828 | 32.5395 | 56.5643 |

TABLE 3-continued (Various data)

| | | | |
|---|---|---|---|
| Back principal points position | 64.3742 | 56.1764 | 56.2597 |

Zoom lens unit data

| Lens unit | Initial surface No. | Focal length | Overall length of lens unit | Front principal points position | Back principal points position |
|---|---|---|---|---|---|
| 1 | 1 | 87.51330 | 3.14200 | 0.39376 | 1.41571 |
| 2 | 3 | −12.88971 | 11.18700 | 0.00481 | 1.30655 |
| 3 | 9 | 17.27828 | 16.48000 | 3.32937 | 3.13563 |
| 4 | 19 | 24.53522 | 3.00000 | −1.00182 | 0.33749 |
| 5 | 21 | −124.71526 | 0.75000 | 3.24059 | 3.52162 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data.

TABLE 4

(Surface data)

| Surface number | r | d | nd | vd |
|---|---|---|---|---|
| Object surface | ∞ | | | |
| 1 | 18.76900 | 4.56700 | 1.61800 | 63.4 |
| 2 | 101.98000 | Variable | | |
| 3* | 75.51900 | 0.75000 | 1.73417 | 52.8 |
| 4* | 8.36500 | 5.33900 | | |
| 5 | −22.15600 | 1.00000 | 1.64347 | 60.0 |
| 6 | 22.71400 | 0.15000 | | |
| 7 | 18.53300 | 1.87700 | 1.99000 | 19.0 |
| 8 | 48.21000 | Variable | | |
| 9* | 13.31900 | 2.10300 | 1.93161 | 26.3 |

TABLE 4-continued (Surface data)

| Surface number | r | d | nd | vd |
|---|---|---|---|---|
| 10 | 421.96800 | 0.60900 | | |
| 11 | 11.64000 | 2.05800 | 1.71885 | 54.4 |
| 12 | 166.58300 | 0.50000 | 1.97554 | 19.2 |
| 13 | 9.26700 | 2.02500 | | |
| 14 (Diaphragm) | ∞ | 0.94300 | | |
| 15 | 163.98600 | 1.00000 | 1.95594 | 19.5 |
| 16 | 19.80300 | 0.85400 | | |
| 17* | 13.29900 | 2.55500 | 1.72082 | 54.2 |
| 18* | −20.32000 | Variable | | |
| 19* | 51.02600 | 1.12200 | 1.88300 | 40.8 |
| 20 | 119.38700 | 0.15000 | | |
| 21 | 23.09400 | 0.50000 | 1.48700 | 82.0 |
| 22 | 10.71800 | 1.38100 | 1.95747 | 22.3 |
| 23 | 20.51100 | Variable | | |
| 24 | 16.24000 | 0.75000 | 1.63550 | 23.9 |
| 25* | 12.70200 | (BF) | | |
| Image surface | ∞ | | | |

TABLE 5

(Aspherical data)

Surface No. 3

K = 0.00000E+00, A4 = −1.54026E−05, A6 = 3.97336E−07, A8 = −2.54627E−09
A10 = 4.89705E−12
Surface No. 4

K = 0.00000E+00, A4 = −2.68846E−05, A6 = −8.56347E−08, A8 = 1.86289E−10
A10 = 1.95052E−10
Surface No. 9

K = 5.43970E−01, A4 = −7.61924E−05, A6 = −6.53856E−07, A8 = 4.24068E−09
A10 = −9.15692E−11
Surface No. 17

K = 0.00000E+00, A4 = −1.91518E−04, A6 = −2.76028E−07, A8 = 1.96711E−08
A10 = 0.00000E+00
Surface No. 18

K = 0.00000E+00, A4 = −7.00488E−05, A6 = −4.07578E−07, A8 = 1.22831E−08
A10 = 1.75685E−10
Surface No. 19

K = 0.00000E+00, A4 = −5.93840E−05, A6 = 5.44141E−07, A8 = 0.00000E+00
A10 = 0.00000E+00
Surface No. 25

K = 0.00000E+00, A4 = −5.63299E−05, A6 = −7.13263E−07, A8 = 2.06193E−07
A10 = −5.49513E−10

TABLE 6

(Various data)

Zooming ratio 3.99978

| | Wide-angle limit | Middle position | Telephoto limit |
|---|---|---|---|
| Focal length | 5.9757 | 11.9349 | 23.9013 |
| F-number | 1.44221 | 1.74828 | 2.27750 |
| View angle | 37.2339 | 20.5966 | 10.1558 |
| Image height | 3.8600 | 4.2700 | 4.2700 |
| Overall length of lens system | 59.7639 | 55.6071 | 59.7455 |
| BF | 3.53508 | 3.53508 | 3.53508 |
| d2 | 0.5000 | 4.4699 | 7.8973 |
| d8 | 19.9474 | 7.4873 | 0.1500 |
| d18 | 4.2680 | 7.1562 | 14.6481 |
| d23 | 1.2804 | 2.7091 | 3.2971 |
| Entrance pupil position | 18.7594 | 27.5028 | 36.8900 |
| Exit pupil position | −12.6856 | −17.6779 | −31.9435 |
| Front principal points position | 22.5336 | 32.7280 | 44.6826 |
| Back principal points position | 53.7882 | 43.6722 | 35.8441 |

Zoom lens unit data

| Lens unit | Initial surface No. | Focal length | Overall length of lens unit | Front principal points position | Back principal points position |
|---|---|---|---|---|---|
| 1 | 1 | 36.45677 | 4.56700 | −0.62360 | 1.17874 |
| 2 | 3 | −8.87705 | 9.11600 | 1.72194 | 3.94601 |
| 3 | 9 | 14.35284 | 12.64700 | 4.28978 | 4.42706 |
| 4 | 19 | 32.75629 | 3.15300 | −0.74260 | 0.72245 |
| 5 | 24 | −99.98091 | 0.75000 | 2.29388 | 2.54414 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows the various data.

TABLE 7

(Surface data)

| Surface number | r | d | nd | vd |
|---|---|---|---|---|
| Object surface | ∞ | | | |
| 1 | 18.24400 | 4.46400 | 1.62336 | 61.9 |
| 2 | 62.81000 | Variable | | |
| 3* | 51.58300 | 0.75000 | 1.73173 | 53.1 |
| 4* | 8.31800 | 5.61500 | | |
| 5 | −21.05000 | 1.00000 | 1.64101 | 60.2 |
| 6 | 21.16400 | 0.15000 | | |
| 7 | 18.33100 | 1.98100 | 1.99000 | 19.0 |
| 8 | 54.05100 | Variable | | |
| 9* | 14.11000 | 1.98500 | 1.90637 | 32.0 |
| 10 | −2150.46900 | 1.46400 | | |
| 11 | 12.36100 | 1.94000 | 1.71972 | 54.3 |
| 12 | −689.69300 | 0.50000 | 1.93464 | 19.9 |
| 13 | 9.89000 | 1.87300 | | |
| 14 | ∞ | 0.94600 | | |
| (Diaphragm) | | | | |
| 15 | 163.72000 | 1.00000 | 1.93168 | 25.6 |
| 16 | 18.11900 | 0.85400 | | |
| 17* | 13.53600 | 2.60400 | 1.70623 | 55.2 |
| 18* | −19.55500 | Variable | | |
| 19 | 19.75400 | 1.58300 | 1.99000 | 19.0 |
| 20 | 62.39600 | Variable | | |
| 21* | 24.71700 | 0.75000 | 1.66426 | 30.9 |
| 22 | 11.19800 | 0.15000 | | |
| 23 | 9.24700 | 1.61800 | 1.87610 | 41.2 |
| 24 | 15.44400 | 0.50000 | 1.71256 | 36.7 |
| 25 | 10.55400 | (BF) | | |
| Image surface | ∞ | | | |

TABLE 8

(Aspherical data)

Surface No. 3

K = 0.00000E+00, A4 = −2.70896E−05, A6 = 5.70440E−07, A8 = −3.32025E−09
A10 = 6.47842E−12

TABLE 8-continued

(Aspherical data)

Surface No. 4

K = 0.00000E+00, A4 = −5.37307E−05, A6 = −3.50264E−07, A8 = 4.30784E−09
A10 = 7.70405E−11

Surface No. 9

K = 5.68103E−01, A4 = −7.51511E−05, A6 = −5.41161E−07, A8 = 3.34753E−09
A10 = −6.19723E−11

Surface No. 17

K = 0.00000E+00, A4 = −1.72215E−04, A6 = 1.53568E−07, A8 = 9.49050E−09
A10 = 0.00000E+00

Surface No. 18

K = 0.00000E+00, A4 = −6.20940E−05, A6 = −5.72056E−08, A8 = 8.02586E−10
A10 = 2.36175E−10

Surface No. 21

K = 0.00000E+00, A4 = −6.11523E−05, A6 = −4.20470E−07, A8 = 2.31432E−08
A10 = −4.21001E−10

TABLE 9

(Various data)

Zooming ratio 3.99981

|  | Wide-angle limit | Middle position | Telephoto limit |
|---|---|---|---|
| Focal length | 5.9746 | 11.9355 | 23.8973 |
| F-number | 1.44511 | 1.73607 | 2.38255 |
| View angle | 37.1393 | 20.9384 | 10.2399 |
| Image height | 3.8500 | 4.2700 | 4.2700 |
| Overall length of lens system | 59.7620 | 57.9708 | 64.0145 |
| BF | 3.53184 | 3.53184 | 3.53184 |
| d2 | 0.5000 | 5.6600 | 8.6440 |
| d8 | 18.7352 | 7.2189 | 0.1500 |
| d18 | 4.2680 | 7.5375 | 17.8758 |
| d20 | 1.0000 | 2.2743 | 2.1005 |
| Entrance pupil position | 19.0108 | 31.1601 | 39.2857 |
| Exit pupil position | −12.1300 | −17.6898 | −45.3633 |
| Front principal points position | 22.7062 | 36.3895 | 51.4999 |
| Back principal points position | 53.7874 | 46.0353 | 40.1173 |

Zoom lens unit data

| Lens unit | Initial surface No. | Focal length | Overall length of lens unit | Front principal points position | Back principal points position |
|---|---|---|---|---|---|
| 1 | 1 | 39.72048 | 4.46400 | −1.08401 | 0.73199 |
| 2 | 3 | −9.20383 | 9.49600 | 1.86240 | 4.16423 |
| 3 | 9 | 15.09317 | 13.16600 | 4.49190 | 4.36433 |
| 4 | 19 | 28.66758 | 1.58300 | −0.36182 | 0.44012 |
| 5 | 21 | −100.21016 | 3.01800 | 10.15960 | 10.67325 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows the various data.

TABLE 10

(Surface data)

| Surface number | r | d | nd | vd |
|---|---|---|---|---|
| Object surface | ∞ | | | |
| 1 | 292.30500 | 1.97700 | 1.55000 | 72.0 |
| 2 | −114.12300 | Variable | | |
| 3* | 75.35700 | 0.75000 | 1.88202 | 37.2 |
| 4* | 10.10600 | 5.63100 | | |
| 5 | −21.93600 | 0.93200 | 1.50634 | 78.4 |
| 6 | 96.92800 | 0.53600 | | |
| 7 | 35.92500 | 2.10400 | 2.00272 | 19.3 |
| 8 | −8417.87700 | Variable | | |
| 9* | 11.14300 | 3.16300 | 1.84888 | 42.7 |
| 10* | −523.32300 | 0.15000 | | |
| 11 | 12.92400 | 2.02400 | 1.62031 | 62.3 |
| 12 | 309.50800 | 0.50000 | 1.75919 | 24.6 |
| 13 | 7.47100 | 3.42500 | | |
| 14 (Diaphragm) | ∞ | 1.72300 | | |
| 15 | 42.43500 | 1.00000 | 1.62908 | 33.1 |
| 16 | 15.58200 | 0.79100 | | |
| 17 | 13.39500 | 3.27900 | 1.56015 | 70.2 |
| 18* | −29.64400 | Variable | | |
| 19 | 8.52200 | 4.33200 | 1.48700 | 82.0 |
| 20* | −12.65700 | Variable | | |
| 21* | −13.20400 | 0.75000 | 1.88300 | 40.8 |
| 22 | 24.89200 | Variable | | |
| 23 | ∞ | 0.75000 | 1.51680 | 64.2 |
| 24 | ∞ | 0.59000 | | |
| 25 | ∞ | (BF) | | |
| Image surface | ∞ | | | |

TABLE 11

(Aspherical data)

Surface No. 3

K = 0.00000E+00, A4 = −1.29168E−04, A6 = 2.20213E−06, A8 = −1.91667E−08
A10 = 8.13803E−11, A12 = −1.32363E−13

Surface No. 4

K = 0.00000E+00, A4 = −1.98358E−04, A6 = 7.45770E−07, A8 = 1.01234E−08
A10 = −2.26294E−10, A12 = 0.00000E+00

Surface No. 9

K = −1.22118E−01, A4 = −4.37317E−05, A6 = 8.55253E−07, A8 = −3.43657E−08
A10 = 6.70993E−10, A12 = 0.00000E+00

Surface No. 10

K = 0.00000E+00, A4 = 4.34891E−05, A6 = 1.82375E−06, A8 = −1.02844E−07
A10 = 2.95907E−09, A12 = −2.52135E−11

Surface No. 18

K = 0.00000E+00, A4 = 3.33821E−05, A6 = 3.49015E−06, A8 = −2.75906E−07
A10 = 1.11964E−08, A12 = −1.62818E−10

Surface No. 20

K = 0.00000E+00, A4 = 3.79043E−05, A6 = 2.90594E−05, A8 = −1.25193E−06
A10 = 2.75226E−08, A12 = −2.45377E−10

Surface No. 21

K = 0.00000E+00, A4 = −5.76168E−04, A6 = 7.41507E−05, A8 = −3.18836E−06
A10 = 7.82176E−08, A12 = −8.16318E−10

TABLE 12

(Various data)

Zooming ratio 3.82320

| | Wide-angle limit | Middle position | Telephoto limit |
|---|---|---|---|
| Focal length | 4.8889 | 9.5489 | 18.6914 |
| F-number | 1.44277 | 1.87044 | 2.71514 |
| View angle | 42.9824 | 24.7106 | 12.8096 |
| Image height | 3.8700 | 4.2700 | 4.2700 |
| Overall length of lens system | 64.8289 | 63.3160 | 75.0956 |
| BF | 0.04692 | 0.10166 | 0.20100 |
| d2 | 0.1500 | 10.1986 | 20.2336 |
| d8 | 26.5355 | 9.0612 | 0.1500 |

TABLE 12-continued (Various data)

| | | | |
|---|---|---|---|
| d18 | 2.0000 | 7.6862 | 18.3738 |
| d20 | 0.8095 | 0.9813 | 0.8502 |
| d22 | 0.0470 | 0.1020 | 0.2010 |
| Entrance pupil position | 13.2217 | 24.3923 | 37.4276 |
| Exit pupil position | −10.5614 | −14.9129 | −24.7182 |
| Front principal points position | 15.8576 | 27.8684 | 42.0990 |
| Back principal points position | 59.9400 | 53.7671 | 56.4042 |

Zoom lens unit data

| Lens unit | Initial surface No. | Focal length | Overall length of lens unit | Front principal points position | Back principal points position |
|---|---|---|---|---|---|
| 1 | 1 | 149.49043 | 1.97700 | 0.91892 | 1.61823 |
| 2 | 3 | −13.83377 | 9.95300 | 0.02061 | 1.32761 |
| 3 | 9 | 16.62353 | 16.05500 | 3.79542 | 3.28373 |
| 4 | 19 | 11.20859 | 4.33200 | 1.25640 | 2.46598 |
| 5 | 21 | −9.68131 | 2.38000 | 0.13679 | 0.74767 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows the various data.

TABLE 13

(Surface data)

| Surface number | r | d | nd | vd |
|---|---|---|---|---|
| Object surface | ∞ | | | |
| 1 | 60.00000 | 1.00000 | 1.70311 | 27.3 |
| 2 | 22.70300 | 7.53000 | 1.88300 | 40.8 |
| 3 | 148.65900 | Variable | | |
| 4* | 34.74600 | 0.75000 | 1.92259 | 28.0 |
| 5* | 9.57000 | 6.65300 | | |
| 6 | −28.28000 | 0.50000 | 1.66233 | 58.3 |
| 7 | 28.35000 | 0.31300 | | |
| 8 | 22.53300 | 2.83600 | 1.99000 | 19.0 |
| 9 | −90.64100 | 1.16900 | | |
| 10 | −32.27100 | 0.70000 | 1.80420 | 46.5 |

TABLE 13-continued (Surface data)

| Surface number | r | d | nd | vd |
|---|---|---|---|---|
| 11 | −688.70700 | Variable | | |
| 12* | 10.60000 | 2.43600 | 1.84413 | 43.0 |
| 13* | −347.12400 | 0.15000 | | |
| 14 | 9.25900 | 2.08300 | 1.53874 | 73.4 |
| 15 | 75.01900 | 0.50000 | 1.76207 | 24.4 |
| 16 | 6.39100 | 2.30900 | | |
| 17 (Diaphragm) | ∞ | 2.19300 | | |
| 18 | −58.14300 | 0.50000 | 1.61462 | 34.8 |
| 19 | 41.95600 | 0.15000 | | |
| 20* | 16.64000 | 1.96600 | 1.52501 | 70.3 |
| 21* | −20.28100 | Variable | | |
| 22* | 10.40100 | 2.47900 | 1.52501 | 70.3 |
| 23* | 50.11000 | Variable | | |
| 24* | 11.94100 | 0.50000 | 1.74624 | 25.1 |
| 25 | 8.99500 | 1.66700 | | |
| 26 | ∞ | 0.75000 | 1.51680 | 64.2 |
| 27 | ∞ | 0.59000 | | |
| 28 | ∞ | (BF) | | |
| Image surface | ∞ | | | |

TABLE 14

(Aspherical data)

Surface No. 4

K = 0.00000E+00, A4 = −1.35874E−04, A6 = 2.55577E−06, A8 = −2.09644E−08
A10 = 8.32379E−11, A12 = −1.32363E−13

Surface No. 5

K = 0.00000E+00, A4 = −1.57590E−04, A6 = 1.17090E−06, A8 = 1.61202E−08
A10 = −1.52295E−10, A12 = 0.00000E+00

Surface No. 12

K = −1.19745E−01, A4 = −4.32812E−05, A6 = 7.89412E−07, A8 = −4.87930E−08
A10 = 9.27803E−10, A12 = 0.00000E+00

Surface No. 13

K = 0.00000E+00, A4 = 4.53718E−05, A6 = 1.43143E−06, A8 = −1.04168E−07
A10 = 2.98879E−09, A12 = −2.52135E−11

TABLE 14-continued (Aspherical data)

Surface No. 20

K = 0.00000E+00, A4 = −4.10538E−05, A6 = −3.19420E−06, A8 = 2.68410E−07
A10 = −1.36043E−08, A12 = 1.62818E−10

Surface No. 21

K = 0.00000E+00, A4 = 3.79250E−05, A6 = −1.89506E−06, A8 = 1.22386E−07
A10 = −5.59579E−09, A12 = 0.00000E+00

Surface No. 22

K = 0.00000E+00, A4 = −5.38440E−05, A6 = 1.99109E−06, A8 = 1.38066E−07
A10 = −9.75255E−09, A12 = 2.45377E−10

Surface No. 23

K = 0.00000E+00, A4 = −2.29446E−04, A6 = 2.34629E−05, A8 = −1.00334E−06
A10 = 1.91791E−08, A12 = 0.00000E+00

Surface No. 24

K = 0.00000E+00, A4 = −4.71348E−04, A6 = 5.02491E−05, A8 = −2.88959E−06
A10 = 7.37692E−08, A12 = −8.16318E−10

TABLE 15

(Various data)

Zooming ratio 6.65044

|  | Wide-angle limit | Middle position | Telephoto limit |
| --- | --- | --- | --- |
| Focal length | 4.8700 | 12.5562 | 32.3875 |
| F-number | 1.44201 | 1.90939 | 3.09670 |
| View angle | 43.0713 | 19.0302 | 7.4415 |
| Image height | 3.8700 | 4.2700 | 4.2704 |
| Overall length of lens system | 70.5609 | 72.3045 | 84.9643 |
| BF | 0.03575 | 0.03575 | 0.03575 |
| d3 | 0.1500 | 13.9195 | 21.9197 |
| d11 | 26.6031 | 8.8706 | 0.1500 |
| d21 | 2.0978 | 6.7981 | 21.4865 |
| d23 | 1.9502 | 2.9353 | 1.6711 |
| Entrance pupil position | 20.4955 | 49.4629 | 74.9818 |
| Exit pupil position | −12.5330 | −19.1097 | −59.8478 |
| Front principal points position | 23.4785 | 53.7935 | 89.8462 |
| Back principal points position | 65.6909 | 59.7483 | 52.5768 |

Zoom lens unit data

| Lens unit | Initial surface No. | Focal length | Overall length of lens unit | Front principal points position | Back principal points position |
| --- | --- | --- | --- | --- | --- |
| 1 | 1 | 70.65186 | 8.53000 | −1.58808 | 2.50975 |
| 2 | 4 | −10.78943 | 12.92100 | 1.93889 | 5.14834 |
| 3 | 12 | 15.07862 | 12.28700 | 1.38171 | 1.93441 |
| 4 | 22 | 24.47440 | 2.47900 | −0.41683 | 0.47081 |
| 5 | 24 | −52.67778 | 2.91700 | 1.25133 | 1.69815 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows the various data.

TABLE 16

(Surface data)

| Surface number | r | d | nd | vd |
|---|---|---|---|---|
| Object surface | ∞ | | | |
| 1 | 28.27200 | 4.12100 | 1.48749 | 70.4 |
| 2 | −305.02600 | Variable | | |
| 3* | −196.12700 | 0.75000 | 1.69384 | 53.1 |
| 4* | 9.20800 | 5.06400 | | |
| 5 | −31.68100 | 0.50000 | 1.48749 | 70.4 |
| 6 | 24.08100 | 0.66000 | | |
| 7 | 17.54600 | 1.82700 | 2.00272 | 19.3 |
| 8 | 29.81400 | Variable | | |
| 9* | 10.22600 | 2.19000 | 1.83617 | 41.9 |

TABLE 16-continued (Surface data)

| Surface number | r | d | nd | vd |
|---|---|---|---|---|
| 10* | 158.52400 | 0.15000 | | |
| 11 | 22.49100 | 1.08000 | 1.48700 | 82.0 |
| 12 | 22.47100 | 0.50000 | 1.82625 | 22.3 |
| 13 | 9.60400 | 3.92500 | | |
| 14 (Diaphragm) | ∞ | 0.41900 | | |
| 15 | 16.18400 | 1.00000 | 1.99000 | 19.0 |
| 16 | 10.07900 | 0.75000 | | |
| 17 | 12.21900 | 2.24300 | 1.74220 | 51.8 |
| 18 | −24.34900 | Variable | | |
| 19 | 26.94300 | 0.75000 | 1.83090 | 22.2 |
| 20 | 12.79000 | Variable | | |
| 21 | 11.83700 | 2.56900 | 1.88394 | 40.3 |
| 22 | −138.04900 | Variable | | |
| 23* | 17.84600 | 0.75000 | 1.54410 | 56.1 |
| 24 | 8.86200 | Variable | | |
| 25 | ∞ | (BF) | | |
| Image surface | ∞ | | | |

TABLE 17

(Aspherical data)

Surface No. 3

$K = 0.00000E+00$, $A4 = -2.51063E-05$, $A6 = 4.36027E-07$, $A8 = -3.11771E-09$
$A10 = 8.83361E-12$

Surface No. 4

$K = 0.00000E+00$, $A4 = -7.15353E-05$, $A6 = -1.32497E-06$, $A8 = 3.05650E-08$
$A10 = -4.09548E-10$

Surface No. 9

$K = -1.94860E-02$, $A4 = -3.56499E-05$, $A6 = 6.62551E-07$, $A8 = -2.66424E-08$
$A10 = 1.04770E-09$

Surface No. 10

$K = 0.00000E+00$, $A4 = 1.23654E-04$, $A6 = 2.52552E-07$, $A8 = -6.85690E-10$
$A10 = 6.28009E-10$

Surface No. 23

$K = 0.00000E+00$, $A4 = -3.52406E-04$, $A6 = 3.46902E-07$, $A8 = -2.09624E-07$
$A10 = 3.26657E-09$

TABLE 18

(Various data)

Zooming ratio 3.79830

| | Wide-angle limit | Middle position | Telephoto limit |
|---|---|---|---|
| Focal length | 5.1206 | 10.0073 | 19.4496 |
| F-number | 1.44208 | 1.73031 | 2.23688 |
| View angle | 41.6227 | 23.2775 | 12.1457 |
| Image height | 3.8600 | 4.2700 | 4.2700 |
| Overall length of lens system | 59.7620 | 57.4546 | 63.9915 |
| BF | 1.39805 | 1.40887 | 1.35952 |
| d2 | 0.5000 | 6.8453 | 12.6442 |
| d8 | 21.0023 | 7.5819 | 0.1500 |
| d18 | 2.0000 | 3.2803 | 7.1991 |
| d20 | 1.6137 | 4.0000 | 7.6356 |
| d22 | 1.0000 | 2.0000 | 2.2551 |
| d24 | 3.0000 | 3.0902 | 3.5000 |
| Entrance pupil position | 16.3827 | 27.0811 | 40.0441 |
| Exit pupil position | −13.6505 | −22.3490 | −84.3363 |

TABLE 18-continued

| (Various data) | | | |
|---|---|---|---|
| Front principal points position | 19.7609 | 32.8731 | 55.0794 |
| Back principal points position | 54.6415 | 47.4473 | 44.5420 |

| Zoom lens unit data | | | | | |
|---|---|---|---|---|---|
| Lens unit | Initial surface No. | Focal length | Overall length of lens unit | Front principal points position | Back principal points position |
| 1 | 1 | 53.29160 | 4.12100 | 0.23596 | 1.57525 |
| 2 | 3 | −10.50663 | 8.80100 | 1.13151 | 2.91735 |
| 3 | 9 | 14.17814 | 12.25700 | 5.42186 | 4.99044 |
| 4 | 19 | −30.02574 | 0.75000 | 0.79904 | 1.12931 |
| 5 | 21 | 12.43355 | 2.56900 | 0.10856 | 1.30288 |
| 6 | 23 | −33.33430 | 0.75000 | 0.99409 | 1.24365 |

The following Table 19 shows the corresponding values to the individual conditions in the zoom lens systems of each of Numerical Examples. The condition (5) is not applied to the zoom lens systems of Numerical Examples 4 and 6.

TABLE 19

(Values corresponding to conditions)

| | | Numerical Example | | | | | |
|---|---|---|---|---|---|---|---|
| | Condition | 1 | 2 | 3 | 4 | 5 | 6 |
| (1) | $|f_W/f_e|$ | 0.04 | 0.06 | 0.06 | 0.50 | 0.09 | 0.15 |
| (2) | $n_{2p}$ | 2.0027 | 1.9900 | 1.9900 | 2.0027 | 1.9900 | 2.0027 |
| (3) | $v_{2p}$ | 19.3 | 19.0 | 19.0 | 19.3 | 19.0 | 19.3 |
| (4) | $L_{G3}/(f_T \times \tan(\omega_T))$ | 3.86 | 2.95 | 3.05 | 3.78 | 2.90 | 2.93 |
| (5) | $\Delta F/(f_T \times \tan(\omega_T))$ | 0.35 | 0.30 | 0.23 | — | 0.40 | — |

The present disclosure is applicable to a digital input device such as a digital camera, a camera for a mobile terminal device such as a smart-phone, a surveillance camera in a surveillance system, a Web camera or a vehicle-mounted camera. In particular, the present disclosure is applicable to a photographing optical system where high image quality is required like in a digital camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system having a plurality of lens units, the zoom lens system, in order from an object side to an image side, comprising:
a first lens unit having, as a unit, positive optical power, the first lens unit being constituted by either one or two lens elements;
a second lens unit having, as a unit, negative optical power, the second lens unit being composed of at least one lens element;
a third lens unit having, as a unit, positive optical power, the third lens unit being constituted by four or more lens elements, with an adjacent two of the third-lens-unit constituting lens elements each having negative optical power;
a fourth lens unit, composed of at least one lens element; and
at least one subsequent lens unit;
an aperture diaphragm that adjusts amount of light into the zoom lens system, the aperture diaphragm being located between the adjacent two of the lens elements constituting the third lens unit and each having negative optical power; wherein
the subsequent lens unit(s) includes a lens unit having negative optical power,
in zooming from a wide-angle limit to a telephoto limit at the time of image taking, the first lens unit and the second lens unit move along an optical axis, and
the following condition (1) is satisfied:

$$0 < |f_W/f_e| < 2 \qquad (1)$$

where,
$f_e$ is a focal length of a lens unit having negative optical power and located closest to the image side in the zoom lens system, and
$f_W$ is a focal length of the zoom lens system at a wide-angle limit.

2. The zoom lens system as claimed in claim 1, wherein in zooming from a wide-angle limit to a telephoto limit at the time of image taking, the first lens unit moves with locus of a convex to the image side.

3. The zoom lens system as claimed in claim 1, wherein the second lens unit includes at least one lens element having positive optical power, and the following conditions (2) and (3) are satisfied:

$$2.0027 \le n_{2p} > 1.8 \quad (2)$$

$$v_{2p} < 24 \quad (3)$$

where, $n_{2p}$ is an average of refractive indices to the d-line of the lens element(s) having positive optical power and constituting the second lens unit, and $v_{2p}$ is an average of Abbe numbers to the d-line of the lens element(s) having positive optical power and constituting the second lens unit.

4. The zoom lens system as claimed in claim 1, wherein the following condition (4) is satisfied:

$$0.5 < L_{G3}/(f_T \times \tan(\omega_T)) < 10 \quad (4)$$

where, $L_{G3}$ is an optical axial thickness of the third lens unit, $f_T$ is a focal length of the zoom lens system at a telephoto limit, and $\omega_T$ is a half view angle (°) at the telephoto limit.

5. The zoom lens system as claimed in claim 1, wherein the lens unit located closest to the image side in the zoom lens system is composed of one, two, or three lens elements.

6. The zoom lens system as claimed in claim 1, wherein a lens unit located second closest to the image side in the zoom lens system is composed of one, two, or three lens elements.

7. The zoom lens system as claimed in claim 1, wherein in zooming from a wide-angle limit to a telephoto limit at the time of image taking, at least one of the subsequent lens unit(s) is fixed with respect to an image surface.

8. The zoom lens system as claimed in claim 7, wherein the following condition (5) is satisfied:

$$0.05 < \Delta F/(f_T \times \tan(\omega_T)) < 4 \quad (5)$$

where, $\Delta F$ is a minimum value of an axial interval between the lens unit fixed with respect to the image surface, and a lens unit adjacent to the lens unit fixed with respect to the image surface, $f_T$ is a focal length of the zoom lens system at a telephoto limit, and $\omega_T$ is a half view angle (°) at the telephoto limit.

9. The zoom lens system as claimed in claim 1, wherein the fourth lens unit has positive optical power, and a fifth lens unit having negative optical power is provided as the subsequent lens unit on the image side of the fourth lens unit.

10. The zoom lens system as claimed in claim 1, wherein the fourth lens unit has negative optical power, and a fifth lens unit having positive optical power and a sixth lens unit having negative optical power are provided in this order, as the subsequent lens units on the image side of the fourth lens unit.

11. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 1.

12. A camera for converting an optical image of an object into an electric image signal, and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is a zoom lens system as claimed in claim 1.

* * * * *